(12) United States Patent
DeNeui et al.

(10) Patent No.: US 10,296,240 B2
(45) Date of Patent: May 21, 2019

(54) CACHE MANAGEMENT

(71) Applicant: HEWLETT PACKARD ENTERPRISE DEVELOPMENT LP, Houston, TX (US)

(72) Inventors: Nathaniel S DeNeui, Houston, TX (US); Michael White, Houston, TX (US); Jeffrey A Plank, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/117,585

(22) PCT Filed: Apr. 28, 2014

(86) PCT No.: PCT/US2014/035736
§ 371 (c)(1),
(2) Date: Aug. 9, 2016

(87) PCT Pub. No.: WO2015/167435
PCT Pub. Date: Nov. 5, 2015

(65) Prior Publication Data
US 2016/0357463 A1 Dec. 8, 2016

(51) Int. Cl.
*G06F 12/0888* (2016.01)
*G06F 3/06* (2006.01)

(52) U.S. Cl.
CPC .......... *G06F 3/0619* (2013.01); *G06F 3/0665* (2013.01); *G06F 3/0689* (2013.01); *G06F 12/0888* (2013.01); *G06F 2212/6046* (2013.01)

(58) Field of Classification Search
CPC ............... G06F 3/0665; G06F 12/0888; G06F 2212/6046
See application file for complete search history.

(56) References Cited

U.S. PATENT DOCUMENTS

| 7,020,745 B1 * | 3/2006 | Kedem | ............... G06F 12/0802 711/100 |
|---|---|---|---|
| 7,761,594 B1 | 7/2010 | Mowat | |

(Continued)

FOREIGN PATENT DOCUMENTS

| CN | 101276260 A | 10/2008 |
|---|---|---|
| CN | 101467136 A | 6/2009 |
| WO | WO-2013095437 A1 | 6/2013 |

OTHER PUBLICATIONS

"AT Attachment 8—ATA/ATAPI Command Set (ATA8-ACS)" Revision 6a published Sep. 6, 2008 available at www.t13.org. Indicated as "A016 NPL ATA8-ACS" (Year: 2008).*

(Continued)

*Primary Examiner* — Michael Alsip
*Assistant Examiner* — Andrew Russell
(74) *Attorney, Agent, or Firm* — Hewlett Packard Enterprise Patent Department

(57) ABSTRACT

A storage controller for cache management that includes a cache memory and a cache management module. The cache management module to, on receipt of region specification requests from hosts, extract from the region specification requests cache rules for management of regions of data storage of a storage array, and on receipt of data operation requests from hosts, process the data operation requests based on the extracted cache rules.

20 Claims, 18 Drawing Sheets

(56) References Cited

U.S. PATENT DOCUMENTS

| | | |
|---|---|---|
| 8,127,088 B2 | 2/2012 | Kolovson |
| 8,285,918 B2 | 10/2012 | Maheshwari |
| 8,533,143 B2 | 9/2013 | Wang et al. |
| 2007/0245085 A1 | 10/2007 | Hoshino et al. |
| 2007/0288687 A1 | 12/2007 | Panabaker |
| 2008/0244188 A1* | 10/2008 | Yoshida ............... G06F 12/0873 711/137 |
| 2009/0070526 A1* | 3/2009 | Tetrick ............... G06F 12/0888 711/113 |
| 2011/0066808 A1 | 3/2011 | Flynn et al. |
| 2011/0238738 A1 | 9/2011 | Wu et al. |
| 2013/0275680 A1 | 10/2013 | Ikegaya |
| 2013/0318196 A1 | 11/2013 | Yamamoto et al. |

OTHER PUBLICATIONS

Byan, S. et al. "Mercury: Host-side Flash Caching for the Data Center," 012 IEEE 28th Symposium on Mass Storage Systems and Technologies (MSST), Apr. 16, 2012, 12 pages, available at http://storageconference.us/2012/Papers/04.Flash.1.Mercury.pdf.

F5 Networks, Inc., "Manual Chapter: Policy Management Guide for the BIG-IP WebAccelerator Module: 2—Overview of the WebAccelerator System," (Web Page), Dec. 11, 2010, 8 pages, available at http://support.f5.com/kb/en-us/products/wa/manuals/product/wa9_4policy/WA_Policy_9_4-03-1.html.

International Search Report & Written Opinion received in PCT Application No. PCT/US2014/035736, dated Jan. 15, 2015, 12 pages.

Shu et al., Data Set Management Commands Proposal for ATA8-ACS2, T13/e07154r6, Revision 6, Dec. 12, 2007 (7 pages).

* cited by examiner

CACHE MANAGEMENT

BACKGROUND

Computing systems may include hosts capable of communicating with storage systems to write data to and read data from the storage systems. The storage systems may include cache memory that may store the data in a manner so that subsequent requests for that data may be retrieved in a faster manner.

BRIEF DESCRIPTION OF THE DRAWINGS

Certain examples are described in the following detailed description and in reference to the drawings, in which.

DETAILED DESCRIPTION

Figure 1:
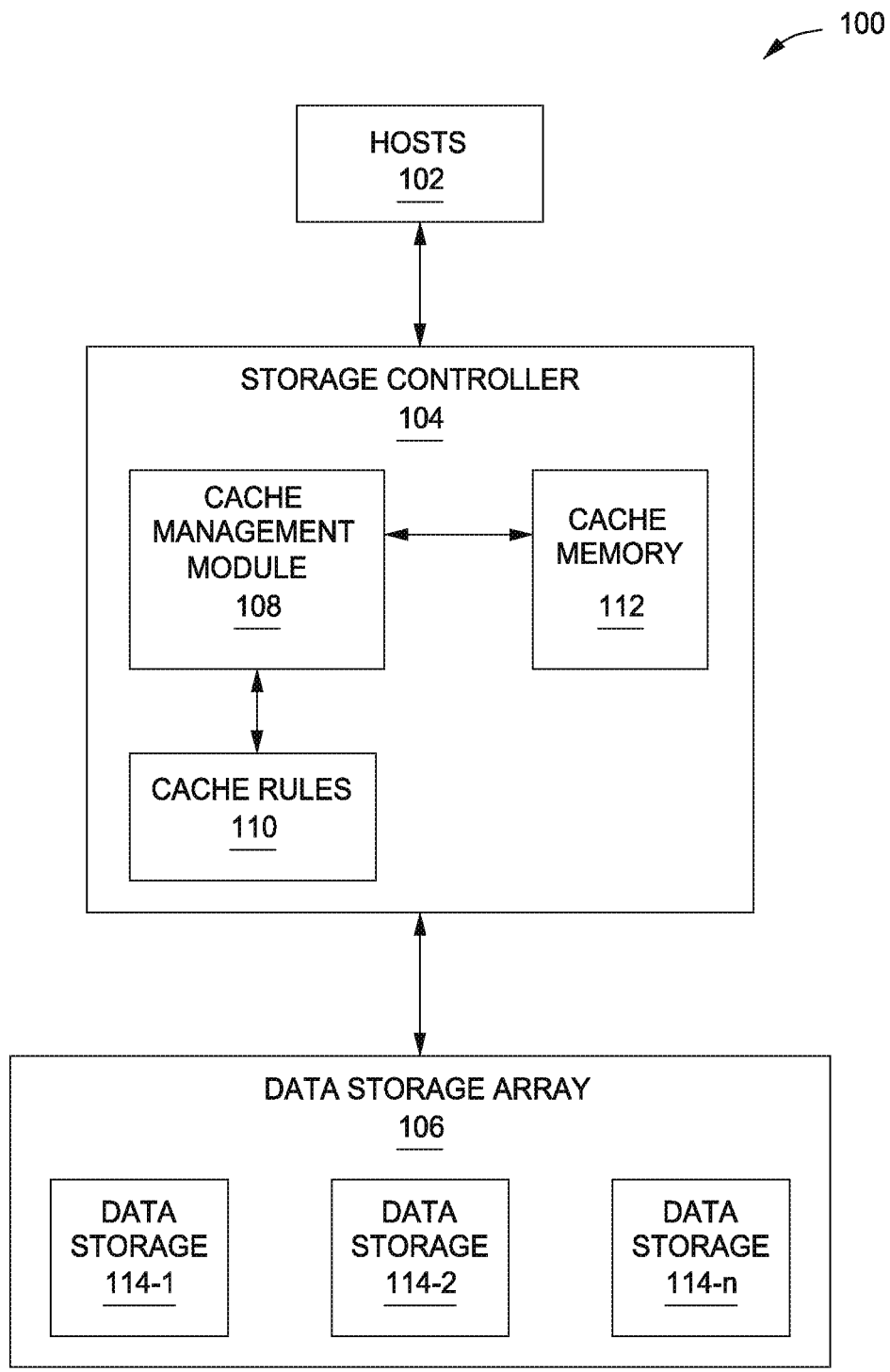
FIG. 1 is an example block diagram of a storage system in accordance with the techniques of the present application.

Computing systems may include hosts or host devices coupled to a storage system to store data to data storage and retrieve data from data storage of the storage system. In one example, the storage system may include a storage controller coupled to a data storage array which manages data storage resources. The storage controller may process data operation requests from the hosts. The data operation requests may include requests to write data to the storage array as well as requests to read data from the data storage array. The data storage array may manage data storage devices such as disk drives and the like. The storage controller may include cache memory which may store some portions of the data so that subsequent requests for that data may be retrieved in a faster manner. The storage controller may receive read requests to read data from data storage. The storage controller may use the cache memory to load blocks of data from slower speed access data storage devices such as disk drives into higher speed storage devices such as the cache memory which may comprise random access memory (RAM). Subsequent read requests may go directly to the higher speed storage devices such as the cache memory which may help reduce latency due to the slower speed data storage devices such as disk drives.

It may be desirable for the storage controller to be able to provide cache management techniques to manage data operation requests in an efficient manner. For example, cache management techniques may apply a uniform set of cache rules to manage the cache memory based on the location of the data on the data storage as well as the relative priority of the data. However, these techniques may not be able to distinguish between data that is frequently accessed or important compared to data that is less frequently accessed or less important. In addition, these techniques may not be able to distinguish between high priority data that is important for processing compared to low priority data. Furthermore, the cache memory is a limited storage resource since it is typically RAM which provides faster access speed but has a higher cost compared to disk drive storage which has higher capacity at lower speed and lower cost. Since cache memory is a limited storage resource, the cache management techniques may make determinations regarding which data to evict or remove from the cache memory to make space or room for other data from the data storage devices. These techniques may result in hot-spotting or other heuristic behavior that may potentially flush or evict higher priority data when such data should remain in the cache memory. Some techniques may be able to retain or "pin" the data to the cache memory which means that it may make the data persistent in the cache memory, though this behavior may be difficult to guarantee. Here, the terms pinning or pin or persistent refers to the notion that data is marked in cache memory so not to be evicted or removed from cache memory except for explicit flush operations. In one example, explicit flush operations may be explicit flush requests that include synchronized cache requests to send all data from cache memory to data storage such as storage media. In other words, when the storage controller performs a later request for the data or attempts to read or upload the data from the cache memory, it may not be present in the cache memory or it may be required to wait before the data may be stored or loaded to the cache memory.

The present application may improve the performance of cache management techniques. These techniques may apply to a storage system having a storage controller coupled between hosts and data storage arrays. For example, these techniques may allow the storage controller to receive from hosts data operation requests such as read requests to read data from data storage. In this case, the read request may specify a block of data from data storage which is to be retained in the cache memory. For example, the read request may include logical block address (LBA) or range of a parent logical unit (LU) or data associated with a specific request to be stored in a persistent fashion in the cache memory. Furthermore, these techniques may allow more data operations (read and write data operations) to be accomplished which may allow the cache memory to be more flexible and to allow host data operation requests for read data from storage and writing data to storage. For example, this may allow the hosts to request to load and specify cache rules that specify that certain data be handled in a persistent manner such that it be retained to cache memory thereby allowing the hosts or users to create hot-spotting regions of storage.

The present techniques may improve cache management performance of storage systems. For example, these techniques may allow host requests in the form of region specification requests which specify cache rules for cache memory that would otherwise have evicted or removed data from the cache memory to now cause the data to remain in the cache memory thereby overriding other cache management processes or algorithms. The host may send to the storage controller region specification requests that include cache rules that specify data associated with certain LBA regions that are not to be flushed or written to the storage devices (disk drivers or media) but rather are to remain persistent in the cache memory. In one example, the region specification requests may be different and separate than data operation requests which may include the actual requests to read data from storage or write data to storage. In another example, the region specification requests may be combined with data operation requests. In another instance, the cache rules may specify that certain data associated with specified LBA regions be stored in a data structure to allow the data to be flushed from the cache memory to data storage when necessary or under certain conditions.

The cache rules may specify that particular data associated with specified LBA region remain persistent in the cache memory and reside adjacent with other data in the cache memory that is associated with different set of cache rules. The host or host application may communicate to the storage controller cache rules that specify multiple LBA regions or ranges with different cache rules to allow different adjustment of behavior. The host may provide cache rules that specify creation of disk drive type configuration in memory, sometimes referred to as soft-RAM type disk drive configuration, with hard backup of the data from cache memory to normal disk drive volumes. The cache rules may specify that particular data is relatively less important than other data to cause storage controller to avoid storing or writing that data to the cache memory all together. In other example, the cache rules may specify other behaviors such as requiring loading requested data into the cache memory keeping or retaining it in the cache memory.

The techniques of the present application may allow the storage controller to improve the cache management performance of the storage system. For example, the techniques may allow the host or user to create a set of cache rules or hints specifying how a particular LBA region or range of a specific data operation request (such as write to storage or read from storage) is to be handled by the cache memory on the targeted data storage device. In one example, storage controller may receive from the host region specification request that includes cache rules of the LBA region that specifies how the cache rules are to be applied to the handling of the data with the data operation request and to determine the manner in which the data storage device is to handle the request. In one instance, the cache rules may specify that particular data associated with an LBA region is to be pinned or retained in a persistent manner (cache pinning case). The storage controller may respond by having the data in the cache memory (e.g., a cache line of the cache memory) be moved to a separate metadata structure that may specify to never flush the data stored in that structure to data storage until the occurrence of particular conditions.

In one example, the cache rules may specify that particular data may be flushed when the storage controller receives a host request to flush the data. In another example, the cache rules may specify that particular data may be flushed when the storage controller has reached a fill level or threshold in the amount of data in that structure which requires the data to be flushed to data storage to allow the cache memory to accept further data. In another example, the techniques may allow data lookup functions to be performed through the metadata associated with the persistent (pinned) region to behave in a similar manner to metadata lookup functions to be performed through non-persistent (non-pinned) regions.

The techniques of the present application may allow the host to provide to the storage controller requests that include cache rules to manage the cache memory. For example, the cache rules may specify that the storage controller is to manage the cache memory in such manner to never wait for space or room to accept new received data. In other example, the cache rules may specify that the storage controller is to manage the cache memory to always wait for space in the cache memory when receiving requests for data with associated with specified LBA regions. In another example, the cache rules may specify that the cache memory should never wait for space in the cache memory when receiving requests for data with associated with specified LBA regions of the data of data storage. In one example, the cache rules may specify that the cache memory should always bypass the cache memory when receiving requests for data associated with specified LBA regions of the data of data storage. In yet another example, the cache rules may specify that the cache memory should store or load in a persistent manner the data in cache memory when receiving requests to read data associated with specified LBA regions of the data of data storage.

The techniques of the present application may improve the performance of the storage system. For example, the host may send to the storage controller cache rules that specify that the cache memory is to process received data in a manner based on the specified associated LBA regions of the data of data storage. As a result, the storage system may exhibit improved performance related to reading data from data storage and writing data to storage based on the cache rules that specify persistent regions. The storage system may handle the cache rules or hints to manage cache memory which may provide user or application with control over cache management. In this manner, these techniques may allow important or critical data to remain high priority and retained in a persistent manner (pinned) in cache memory. These techniques may help reduce the number of write operations to LBA regions that have been specified as important while reserving more data storage device (disk drive) performance to regions or areas where the data may not have to be stored in the cache memory in a persistent manner (pinned). These techniques may help create disk drive like regions in cache memory (soft-RAM disk regions) which may allow creation of high performance regions that may be persistently stored in cache memory in a safe fashion. These techniques may configure the storage controller to load and persistently store data which may allow for the user to specify soon to be hot data to be pre-loaded in a persistent manner in the cache memory, thereby help to improve overall storage system performance.

In one example, the present application discloses a storage controller for cache management that includes a cache memory and a cache management module. The cache management module is configured to receive region specification requests from hosts, and in response, extract from the region specification requests cache rules for management of regions of data storage of a storage array. The cache management module is configured to receive data operation requests from hosts, and in response process the data operation requests based on the extracted cache rules.

In some examples, the data operation requests may include host requests to read data from storage as well as host request to write data to storage. The region specification requests may specify behavior of the cache memory with respect to regions of storage associated with logical block address (LBA) of storage. The region specification requests may include cache rules to manage the cache memory with respect to LBA regions of storage. For example, a cache rule may specify to store the data to storage and bypass the cache memory. In another example, a cache rule may specify may specify to store the data to cache memory based on availability of space of the cache memory. In another example, a cache rule may specify to store the data to the cache memory in non-persistent manner in the cache memory. For example, a cache rule may specify to store the data in a persistent manner in the cache memory. The cache management module may be configured to receive data operation requests from the hosts that includes write requests to write data to storage and identification of regions of data storage to write. In another example, the cache management module may be configured to receive data operation requests from the hosts that include the data and identification of regions of data storage to write the data. The cache management module may be configured to compare the regions from the requests with a list of regions received from the region specification requests.

FIG. 1 is an example block diagram of a storage system 100 in accordance with the techniques of the present application.

The system 100 includes a storage controller 104 configured for cache management that includes a cache memory 112 and a cache management module 108. The storage controller 104 is shown coupled between hosts 102 and data storage array 106 which includes data storage 114-1 through 114-n.

The cache management module 108 is configured to perform cache management functions such as processing region specification requests and data operation requests from hosts 102 described herein. In one example, cache management module 108 is configured to receive region specification requests from hosts 102, and in response, extract from the region specification requests cache rules 110 for management of cache memory 112 and regions of data storage 114 of data storage array 106. The cache management module 108 is configured to receive data operation requests from hosts, and in response, process the data operation requests based on the extracted cache rules 110.

The cache management module 108 is configured to manage data operation requests from hosts 102. The data operation requests may include host requests to read data from data storage 114. For example, hosts 102 may send data operation requests that include LBA region information to identify locations of the data to be read or retrieved from data storage 114. In another example, the data operation requests may include host requests to write data to data storage 114. For example, hosts 102 may send data operation requests that include data and LBA region information to identify locations to write the data to the specified locations of data storage 114. The cache management module 108 is configured to process the LBA region information to determine how to process the data operation requests. For example, cache management module 108 may compare the LBA regions that are included with the requests with a list of LBA regions (e.g., cache rules 110) received from region specification requests. The cache management module 108 performs this comparison to determine how to process the requests with respect to cache memory 112, as explained below in further detail.

The cache management module 108 may be configured to receive region specification requests. In one example, region specification requests may specify regions of storage associated with logical block address (LBA) of storage. In one example, region specification requests may include cache rules 110 (sometimes referred to as cache hints) to manage cache memory 112. Some examples of cache rules include: Bypass Rule: where the data for the range of LBAs is to be sent directly to the disk; Never Wait for Room Rule: where the data for the range is to be sent directly to the disk if it cannot be immediately placed in the data cache and data will be evicted as needed; Always Wait for Room Rule: where the data for the range is to be queued for later handling if it cannot be immediately placed in the cache memory and data will be evicted as needed; Pinned Rule: where data for the range is to be queued for later handling if it cannot be immediately placed in the data cache and data will only be evicted at host request. In one example, cache rules 110 may include cache rules or hints to store the data to storage and bypass the cache memory for specified LBA regions. In other examples, cache rules 110 may include cache rules or hints to store the data to cache memory 112 based on availability of space of the cache memory for specified LBA regions.

In other example, cache rules 110 may include cache rules or hints to store the data to cache memory 112 in non-persistent manner in the cache memory for specified LBA regions. In one example, non-persistent may be defined as a condition or rule where data may be evicted from cache memory 112 if space is needed. On the other hand, persistent (pinned) may be defined as a condition or rule where data may not be evicted from cache memory 112 unless specified. In other example, cache rules 110 may include cache rules or hints to store the data in a persistent manner in cache memory 112 for specified LBA regions. It should be understood that other example cache rules may be applied to implement the techniques of the present application.

The hosts 102 may be any electronic devices or computing devices capable of data processing and exchanging data with other electronic devices. The hosts 102 may comprise computing system(s) that utilize storage on its own behalf, or on behalf of systems coupled to the hosts. For example, hosts 102 may be supercomputers processing large databases or a transaction processing server maintaining transaction records. In another example, hosts 102 may be file servers on a local area network (LAN) or wide area network (WAN) that provide storage services for an enterprise. The file servers may comprise disk controllers and/or RAID controllers configured to manage multiple disk drives. The hosts 102 may connect storage controller 104 as part a storage network via a communication connection such as a Fibre Channel (FC) connection. The hosts 102 may be servers that provide services to other computing or data processing systems or devices. For example, hosts 102 may be client computers that may access storage controller 104 and data storage array 106 through other hosts. The hosts 102 may provide file services to client computers and may provide other services such as transaction processing services, email services and the like. Therefore, client computers may be configured to directly use storage consumed by hosts 102. The storage controller 104 is shown coupled between hosts 102 and data storage array 106. The storage controller 104 may be any electronic device or computing device capable of processing and managing requests from hosts to access data from data storage array 106. The storage controller 104 may manage the operations and the transfer of data between storage arrays 106. The storage controller 104 may be implemented as plug-in cards having processors and memory. The storage controller 104 may include dual host adapter ports (not shown) that provide an interface to hosts 102 (i.e., through a communication network such as a switching fabric). The storage controller 104 may include communication ports (not shown) to enable communication connections between other storage controllers. The communication connection may be implemented as a FC point-to-point connection, or pursuant to any other suitable communication protocol.

The storage controller 104 may be configured to communicate with data storage array 106. In one example, storage controller 104 may include plurality of Fiber Channel Arbitrated Loop (FCAL) ports (not shown) that implement an FCAL communication connection with data storage array 106 and plurality of data storage devices 114. While FCAL connections may be used to communicate with storage array 106, it should be understood that the communication connection with the storage array may be implemented using other communication protocols. For example, rather than an FCAL configuration, a FC switching fabric may be used. The data storage array 106 may manage access to data storage 114 as part of a storage network. The data storage 114 may comprise a storage pool with a quantity of storage space. In one example, the data storage may have a size or storage capacity determined by the particular hardware used to implement the data storage. The storage controller 104 may configure data storage 114 as a plurality of logical disks which may be allocated within the data storage or storage pool. Each of the logical units may or LBA regions may comprise a contiguous range of logical addresses that may be addressed by hosts 102 mapping requests from the protocol used by the hosts to uniquely identify the logical units.

The cache memory 112 may generally have faster access time than data storage 114 which may have lower access time. The cache memory 112 may be any non-transitory, computer-readable medium that may include one or more of a non-volatile memory, a volatile memory, and/or one or more storage devices. Examples of non-volatile memory include, but are not limited to, RAM, electrically erasable programmable read only memory (EEPROM) and read only memory (ROM). Examples of volatile memory include, but are not limited to, static random access memory (SRAM), and dynamic random access memory (DRAM). Like cache memory 112, data storage 114 may be any non-transitory, computer-readable medium that may include one or more of a non-volatile memory, a volatile memory, and/or one or more storage devices. In other examples, cache memory 112 and data storage 114 may include not limited to, hard disk drives, compact disc drives, digital versatile disc drives, optical drives, and flash memory devices.

The system 100 may be configured as a storage network that may be used to implement a storage pool formed from data storage 114. The network may include hosts 102 connected to storage controller 104 using a communication network which may be implemented as a private, dedicated network such as FC switching fabric. In other examples, portions of the communication network may be implemented using public communication networks pursuant to a suitable communication protocol such as the Internet Small Computer Serial Interface (iSCSI) protocol.

The system 100 of FIG. 1 is shown with storage controller 104 coupled between hosts 102 and data storage array 106. However, it should be understood that system 100 shown in FIG. 1 is for illustrative purposes and that other configurations may be possible to implement the techniques of the present application. In one example, the techniques of the present application may be implemented in hardware, software or a combination thereof. In another example, hosts 102 may include a single host or multiple hosts coupled to storage controller 104. The storage controller 104 is shown as a single device but the functionality of the storage controller may be distributed between multiple storage controllers. Likewise, single data storage array 106 is shown as a single device but the functionality of the data storage array may be distributed between multiple data storage arrays. In other examples, the components of system 100 may be integrated as one component, multiple components with the functionality of the system distributed across the multiple components or a combination thereof.

Figure 2:
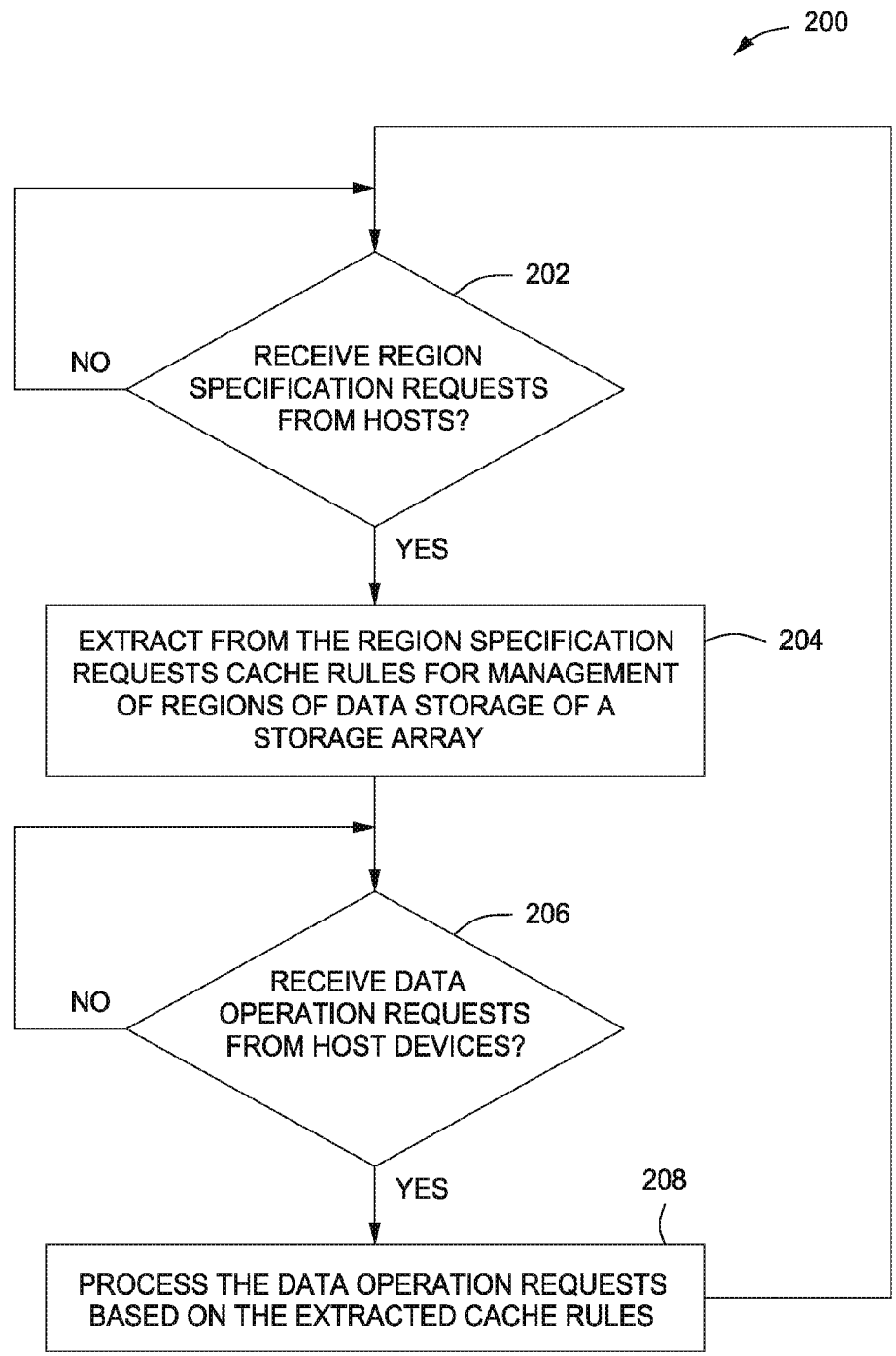
FIG. 2 is an example process flow diagram of a method of cache management in accordance with the techniques of the present application.

FIG. 2 is an example process flow diagram 200 of a method of cache management in accordance with the techniques of the present application.

Processing may begin at block 202 where storage controller 104 checks whether it has received from hosts 102 region specification requests. For example, if cache management module 108 received from hosts 102 region specification requests, then cache management module processing proceeds to block 204. On the other hand, if cache management module 108 has not received region specification requests, then cache management module processing proceeds back to block 202 where the cache management module may continue to check for receipt of region specification requests.

At block 204 storage controller 104 extracts from the region specification requests cache rules 110 to be used for management of regions of data storage 114 of storage array 106. In one example, cache management module 108 may process the region specification requests which may specify behavior of cache memory 112 with respect to regions of data storage 114 associated with logical block address (LBA) of the data storage. In another example, the region specification requests may include cache rules to manage cache memory 112 with respect to LBA regions of data storage. The cache rules 110 may specify that cache management module 108 store the data to storage and bypass the cache memory, store the data to cache memory based on availability of space of the cache memory, store the data to the cache memory in non-persistent manner in the cache memory, store the data in a persistent manner in the cache memory, and the like. In one example, cache management module 108 may store the information from the region specification requests as cache rules 110 for subsequent processing. The cache management module 108 processing then proceeds to block 206.

At block 206 storage controller 104 checks whether it has received from hosts 102 data operation requests. In one example, if cache management module 108 received from hosts 102 data operation requests, then processing proceeds to block 208. On the other hand, if cache management module 108 has not received from hosts 102 data operation requests, then processing proceeds back to block 206 to continue to check for receipt of data operation requests. In another example, if cache management module 108 has not received from hosts 102 data operation requests, then cache management module processing may proceed back to block 202 to continue to check for receipt of other region specification requests.

At block 208 storage controller 104 in response to receiving data operation requests from host devices, processes the data operation requests based on the extracted cache rules. In one example, cache management module 108 may receive from hosts 102 a data operation request which includes a write request that includes data to write to storage and identification of regions of data storage to write the data. In another example, cache management module 108 may receive from hosts 102 a data operation request which that includes a read request that includes identification of regions of data storage 114 to read the data. In other examples, cache management module 108 may be configured to compare the LBA region information from the data operation requests with a list of the cache rules 110 and associated LBA regions extracted from the region specification requests previously provided by hosts 102. In one example, cache management module 108 may process the data operation requests based on the extracted cache rules from the region specification requests. Processing may proceed back to block 202 to continue to check for receipt of other region specification requests. In other examples, cache management module 108 may proceed back to block 206 to continue to check for receipt of data operation requests. It should be understood that the process described with respect to FIG. 2 is for illustrative purposes and other examples may be employed to implement the techniques of the present application.

Figure 3:
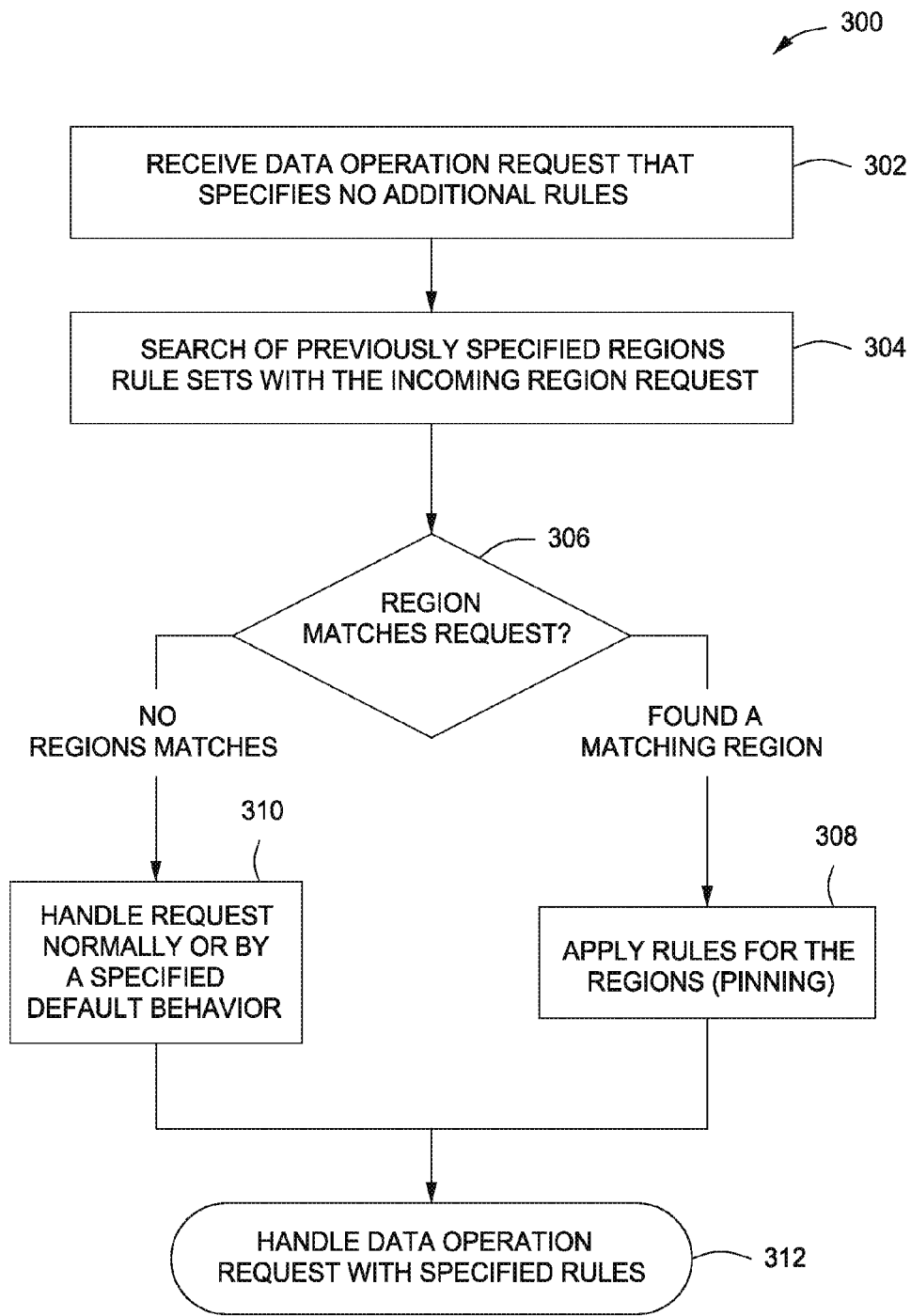
FIG. 3 is another example process flow diagram of a method of cache management in accordance with the techniques of the present application.

FIG. 3 is another example process flow diagram 300 of a method of cache management in accordance with the techniques of the present application.

Processing may begin at block 302 where storage controller 104 receives a data operation request that specifies no additional cache rules. In one example, cache management module 108 receives a data operation request that may specify a write operation to write data to data storage and include the data to be written and an LBA region of the location in data storage 114 to write the data. In another example, the data operation request may specify a read operation to read data from data storage and include an LBA region of the location in the data storage to read the data. The cache management module 108 processing then proceeds to block 304.

At block 304, storage controller 104 searches previously specified region rule sets with the received region request. To illustrate operation, in one example, it may be assumed that cache management module 108 previously received from hosts 102 region specification requests that included cache rules associated with LBA regions for handling the cache memory 112 when it receives subsequent data operation requests from the hosts. The cache management module 108 may extract cache rules from the region specification requests and store these extracted cache rules 110 and associated LBA regions for subsequent processing of data operation requests from hosts 102. For example, cache management module 108 may compare the regions specified in the cache rules with the regions specified in data operation requests to determine how to process the data operation requests with respect to cache memory 112. The cache management module 108 processing then proceeds to block 306.

At block 306, storage controller 104 checks whether the region specified in the data operation request matches regions specified from previously received region specification requests. In one example, cache management module 108 checks the region information in cache rules 110 with the region information from the data operation request. If cache management module 108 determines that there is a match, then processing proceeds to block 308. On the other hand, if cache management module 108 determines that there is no match, then cache management processing proceeds to block 310.

At block 308, storage controller 104 applies rules for the regions. As explained above, region specification requests may specify behavior of the cache memory 112 with respect to regions of storage associated with logical block address (LBA) of storage. The region specification requests may include cache rules 110 to specify how to manage cache memory 112 with respect to LBA regions of storage. For example, a cache rule 110 may specify to store particular data to storage and bypass cache memory 112. In another example, a cache rule 110 may specify to store the data to cache memory 112 based on availability of space of the cache memory. Another cache rule 110 may specify to store the data to cache memory 112 in a non-persistent manner. In one example, cache management module 108 may process the data operation request based on the LBA region included with the data operation request that matches the previously received LBA regions from the region specification requests. The cache management module 108 processing proceeds to block 312.

At block 310, storage controller 104 handles requests normally or by a specified default behavior. In some examples, when cache management module 108 determines that there is no match between the LBA region of the data operation request and the previously received LBA region from the region specification requests, then it handles the data operation requests in a normal manner or by a specified default behavior. Processing proceeds to block 312

At block 312, storage controller 104 handles data operation requests with the specified cache rules 110. In one example, cache management module 108 processing may proceed back to block 302 to continue to receive or monitor for receipt of the data operation requests.

It should be understood that the process described with respect to FIG. 3 is for illustrative purposes and other examples may be employed to implement the techniques of the present application.

Figure 4:
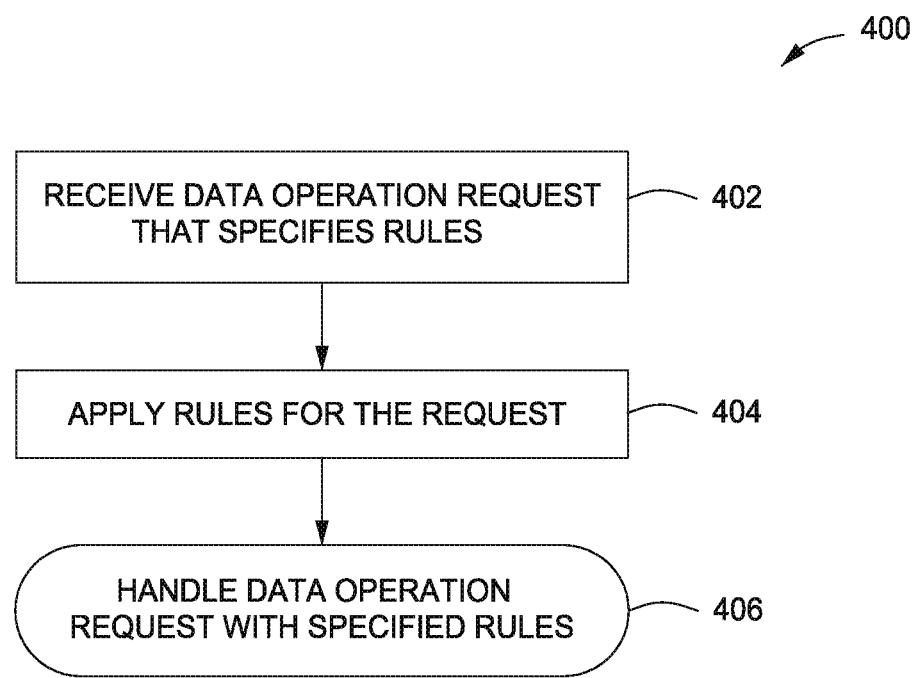
FIG. 4 is yet another example process flow diagram of a method of cache management in accordance with the techniques of the present application.

FIG. 4 is yet another example process flow diagram 400 of a method cache management in accordance with the techniques of the present application.

Processing may proceed to block 402 where storage controller 104 receives or monitors for receipt of data operation requests that specifies cache rules 110. As explained above, cache management module 108 may receive from hosts 102 region specification requests which may specify behavior of cache memory 112 with respect to regions of storage associated with logical block address (LBA) of storage. The region specification requests may include cache rules 110 to manage cache memory 112 with respect to LBA regions of storage. The cache management module 108 processing proceeds to block 404.

At block 404, storage controller 104 applies rules for the request (Pinning). To illustrate operation, in one example, cache management module 108 may have received a region specification request that included a cache rule 110 or hint to store the data in a persistent manner (pinning) in cache memory 112. It should be understood that other example cache rules may be applied to implement the techniques of the present application. The cache management module 108 processing proceeds to block 406.

At block 406, storage controller 104 handles data operation request with specified rules. In one example, it is assumed continuing with the above example, cache management module 108 received a cache rule 110 to store the data in a persistent manner (pinning) in cache memory 112. In this case, it may be assumed that cache management module 108 determines that there is no match between the LBA region of the data operation request and the previously received LBA region related to pinning, then it may handle the data operation request in a normal manner or by a specified default behavior. On the other hand, if cache management module 108 determines that there is a match between the LBA region of the data operation request and the previously received LBA region related to pinning, then it may handle the data operation requests by applying the cache rules related to pinning. Once processing of block 406 is performed, cache management module 108 processing may proceed back to block 402 to continue to receive or monitor for receipt of data operation requests that specify cache rules 110 for management of cache memory 112 as well as data operation requests that specify requests to read data from data storage requests to write data to data storage.

It should be understood that the process described with respect to FIG. 4 is for illustrative purposes and other examples may be employed to implement the techniques of the present application.

FIGS. 5A-5F are example process flow diagrams of cache management techniques in accordance with the techniques of the present application. The process flow diagrams of FIGS. 5A-5F describe how storage controller 104 manages cache memory 112. As explained above, storage controller 104 may receive from hosts 102 region specification requests which may specify how cache management module 108 is to manage or control the behavior of cache memory 112 with respect to regions of storage associated with LBA of data storage 114. That is, the region specification requests may include cache rules 110 to control how cache management module 108 is to manage cache memory 112 with respect to LBA regions of data storage 114. The storage controller 104 may then receive from hosts 102 a data operation request which may specify a write operation to write data to data storage 114 and include the data to be written and an LBA region of the location in data storage 114 to write the data. In another example, the data operation request may specify a read operation to read data from data storage 114 and include an LBA region of the location in the data storage to read the data. As explained below in further detail, storage controller 104 may process the data operation request based on the result of comparison between the LBA regions included with the data operation request compared with previously received LBA region and cache rules from the region specification requests that are stored as cache rules 110.

Figure 5A:
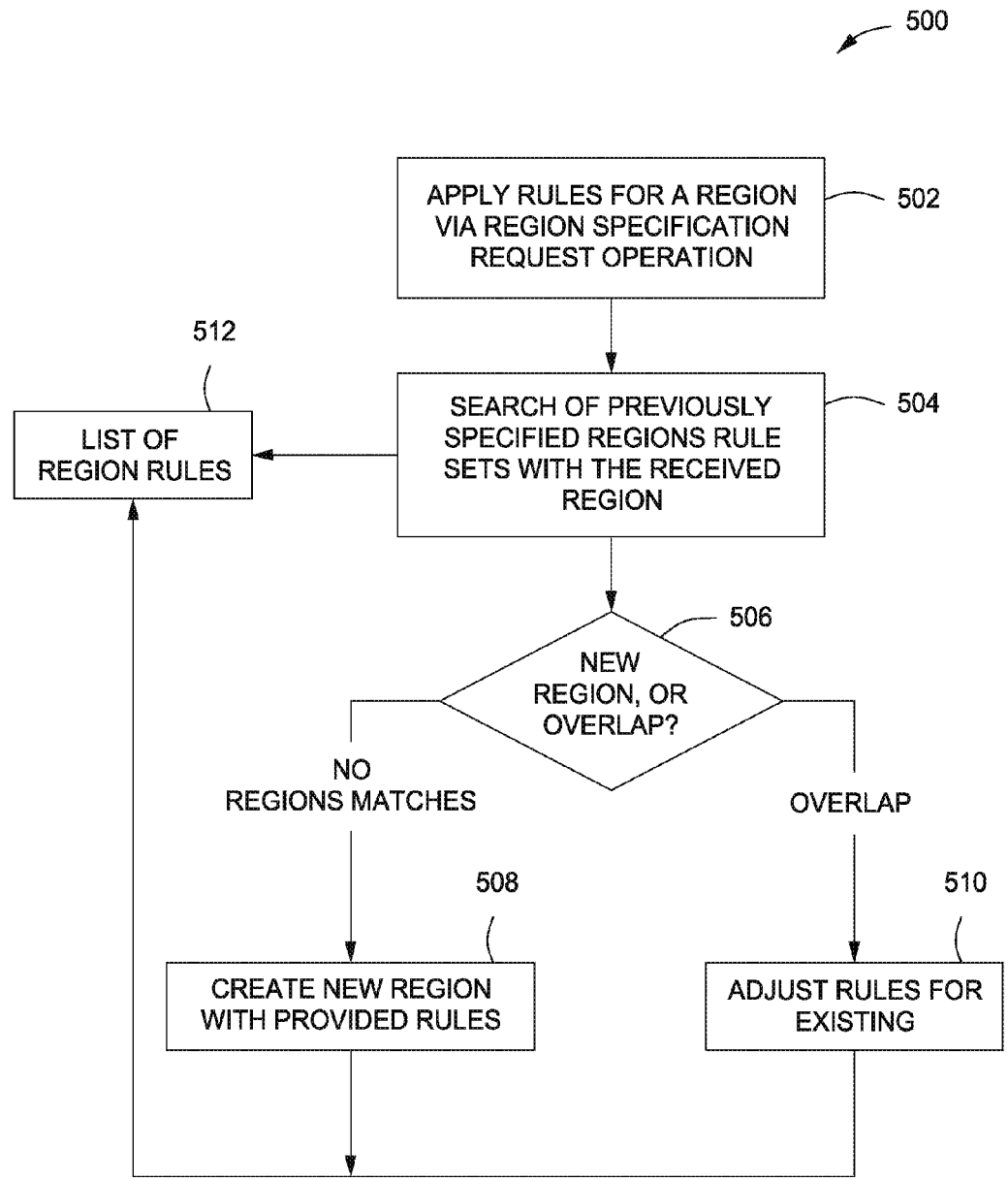
FIGS. 5A-5F are example process flow diagrams of cache management in accordance with the techniques of the present application.

FIG. 5A illustrates an example process flow diagram 500 of cache management techniques in accordance with the techniques of the present application.

Processing may begin at block 502 where storage controller 104 receives rules for a region via a region specification request. As explained above, cache management module 108 may receive from hosts 102 region specification requests which may include cache rules 110 to specify or instruct how to manage cache memory 112 with respect to LBA regions of data storage 114. The cache management module 108 processing then proceeds to block 504.

At block 504, storage controller 104 searches previously received specified regions rule sets using the received region. In one example, cache management module 108 may compare the received region specification information including the cache rule along with the corresponding LBA of the region to the list of region specification information including cache rules 110 at block 512. The cache management module 108 processing then proceeds to block 506.

At block 506, storage controller 104 checks the received regions to determine whether they are new regions or whether there are overlaps. For example, if cache management module 108 determines that the received LBA region information specifies new region information and cache rules that do not exist in the current cache rules 110 list at block 512, then cache management module 108 processing proceeds to block 508. In one case, for example, this condition may occur when the received cache rule and/or the region associated with the cache rule do not exist in cache rules 110. On the other hand, if cache management module 108 determines that the received LBA region information specifies new region information and cache rules that overlap with the current cache rules 110, then cache management module processing proceeds to block 510. In one case, for example, an overlap condition may occur when the received cache rule and/or the region associated with the cache rule overlaps with cache rule and/or the region associated with the cache rule that is in cache rules 110

At block 508, storage controller 104 creates new regions with provided rules. For example, it may be assumed that cache management module 108 determined that the received LBA region information specifies new region information and cache rules that do not exist in the current cache rules 110 at block 512. In this case, cache management module 108 creates an entry in the new region cache rules 110 at block 512 with an entry value corresponding to the cache rule of the request which specifies the LBA region and associated cache rules. In one example, cache management module 108 processing may proceed back to block 502 to continue to check for further input region specification requests.

At block 510, storage controller 104 adjusts rules for existing regions. In one example, as explained above, cache management module 108 received from hosts 102 a region specification request that include a cache rule that overlaps with a cache rule previously stored in cache rules 110 at block 512. That is, the received LBA region information specifies new region information and cache rules that overlap with the current cache rules 110 at block 512. An overlap condition may occur when the received cache rule and/or the region associated with the cache rule overlaps with cache rule and/or the region associated with the cache rule that is in cache rules 110. In this case, cache management module 108 adjusts the cache rules 110 at block 512 in accordance with the received cache rules. In one example, cache management module 108 may revise or adjust the information in cache rules 110 at block 512 such as the cache rule itself, the LBA region associated with the rule or a combination thereof. In one example, cache management module 108 processing may proceed back to block 502 to continue to check for further input region specification requests.

Figure 5B:
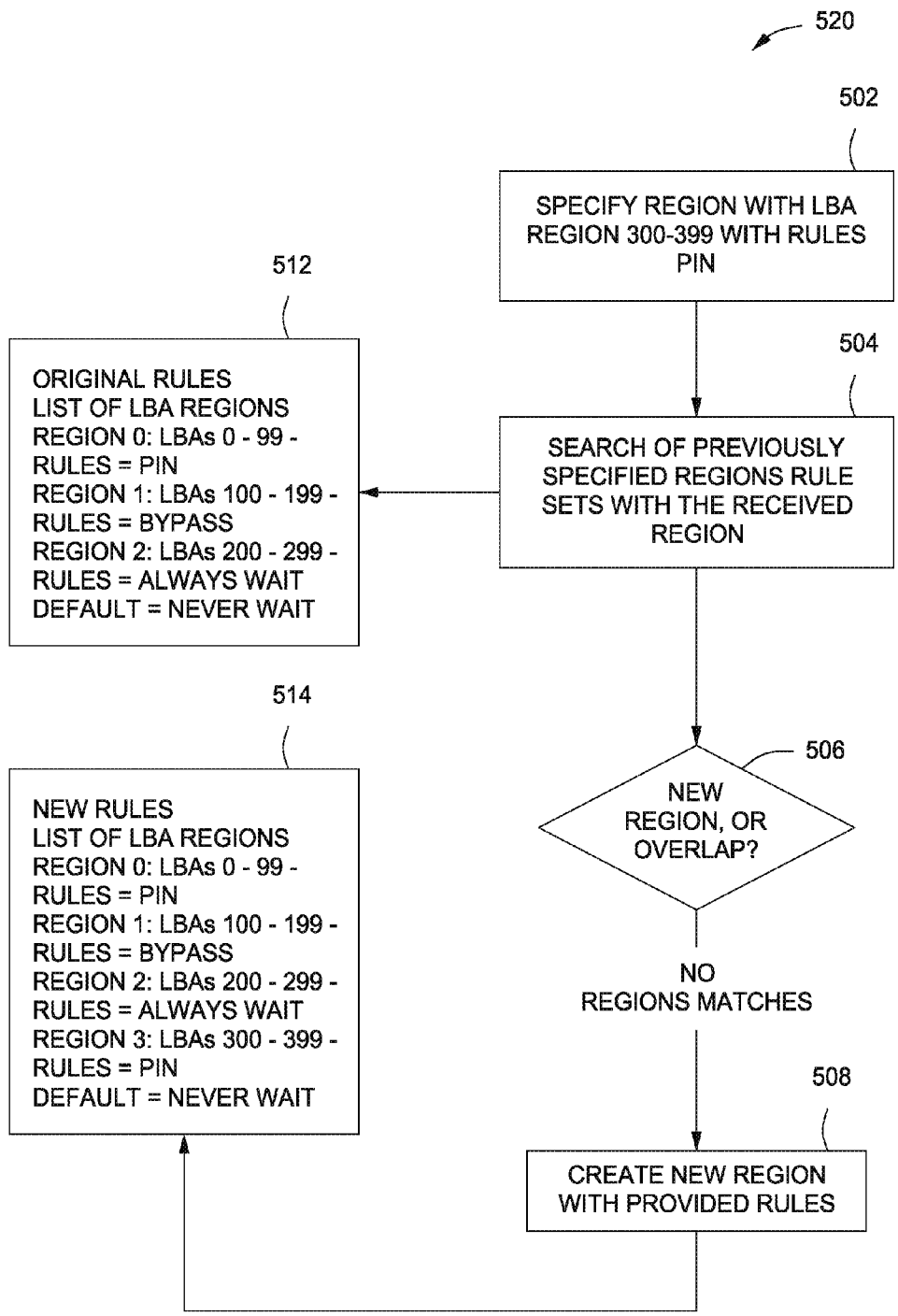

FIG. 5B illustrates an example process flow diagram 520 of cache management techniques in accordance with the techniques of the present application. The process illustrated in FIG. 5B is similar to FIG. 5A except in the description of FIG. 5B the storage controller 104 receives a specific region specification request and thereby the process follows a particular path.

To illustrate operation, it will be further assumed that block 512 provides a cache rules 110 of original rules before receipt of the new received region specification request and block 514 provides updated cache rules 110 based on the cache rules from the new received region specification request. For example, it may be assumed that cache rules 110 at block 512 includes the following cache rules and associated LBA regions. For Region 0, the entry specifies that for data operation requests with LBA regions 0 through 99, the cache rule specifies that cache management module 108 is to store the data in a persistent manner in cache memory 112. For Region 1, the entry specifies that for data operation requests with LBA regions 100 through 199, the cache rule specifies that cache management module 108 is to store the data to storage and bypass cache memory 112. For Region 2, the entry specifies that for data operation requests with LBA regions 200 through 299, the cache rule specifies that cache management module 108 is to wait to store the data to cache memory 112 based on availability of space of the cache memory. For Default, that is, for requests that are outside the ranges of the above LBA regions (Region 0, 1 and 2), the entry specifies cache management module 108 is to never wait for space in cache memory 112 to store the data in the cache memory. It should be understood the entries of cache rules 110 at block 512 are for illustrative purposes and that a different number and type of cache rules and associated LBA regions may be employed to practice the techniques of the present application. For example, cache rules 110 at block 512 may include a different number of entries specifying different LBA regions and different cache rules associated with the regions.

Processing may begin at block 502 where storage controller 104 receives rules for regions via region specification request operations. In this example, to illustrate, it may be assumed that cache management module 108 receives a regions specification request that specifies an LBA region 300-399 and associated cache rules that specify to pin data in cache memory 112 that is associated or located at LBA region 300-399. That is, in this case, the cache rule specifies that cache management module 108 is to store the data in a persistent manner (pinning case) in cache memory 112 if the region associated with the data operation request matches the LBA region 300-399. The cache management module 108 processing then proceeds to block 504.

At block 504, storage controller 104 searches previously specified regions rule sets with the received region request. In one example, cache management module 108 searches cache rule 110 at block 512 to determine whether the received region is listed or has an entry in the cache rules. In this case, cache management module 108 determines that the received region request (LBA region 300-399 and with associated cache rules to pin data in cache memory) is not present in the cache list at block 512. The cache management module 108 processing proceeds to block 506 for further analysis.

At block 506, storage controller 104 checks the received regions to determine whether they are new regions or whether there are overlaps. In this case, to illustrate operation, it may be assumed that cache management module 108 determines that the received region is not present in cache rules 110 at block 512 and therefore this is a new cache rule and associated LBA region. In this case, processing proceeds to block 508 where cache management module 108 creates entry in cache rule 110 at block 514 with the new region with the provided cache rules. In this case, cache management module 108 creates an entry at block 514 with entry value corresponding to the request. That is, Region 3 is to specify LBA region 300-399 and with associated cache rules to pin data in cache memory 112. In one example, cache management module 108 processing may proceed back to block 502 to continue to check for input region specification requests.

Figure 5C:
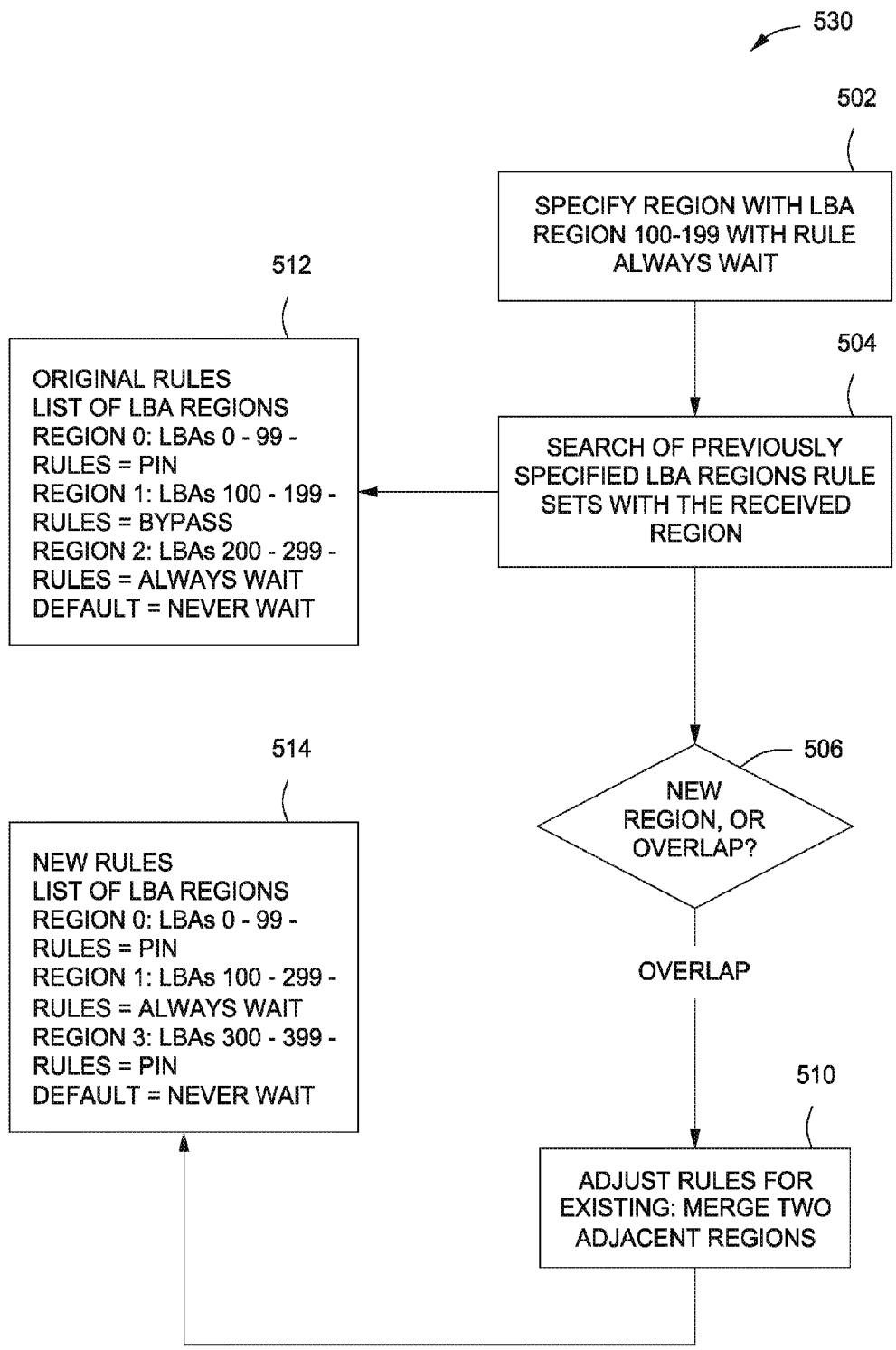

FIG. 5C illustrates an example process flow diagram 530 of cache management techniques in accordance with the techniques of the present application. The process illustrated in FIG. 5C is similar to FIG. 5A except in the description of FIG. 5C the storage controller 104 receives a specific region request and thereby the process follows a particular path. It will be further assumed that block 512 provides a list of current or original cache rules 110 and block 514 provides a list of new or updated cache rules after receipt of the region specification request, as described below.

Processing may begin at block 502 where storage controller 104 receives rules for regions via region specification request operations. In this example, to illustrate, it may be assumed that cache management module 108 receives a request that specifies an LBA region 100-199 with an associated cache rule 110 that specifies or instructs the cache management module to always wait for space in cache memory 112 when it is to write data to cache memory 112. That is, in this case, cache rule 110 specifies or instructs cache management module 108 to wait for space in cache memory 112 before it stores the data in the cache memory. The cache management module 108 processing proceeds to block 504 where it searches previously specified regions rules 110 with the received coming region request. In one example, cache management module 108 searches cache rules 110 at block 512 to determine whether the received region and cache rule is listed in cache rules 110 at block 512. In this case, cache management module 108 determines that the received region request (LBA region 100-199 with cache rule to specify to always wait for space in cache memory) appears to be present in cache rules 110 at block 512. The cache management module 108 processing proceeds to block 506 for further analysis.

At block 506, storage controller 104 checks the received regions to determine whether they are new regions or whether there are overlaps. In this case, cache management module 108 determines that there is an overlap between the received region and a region listed in cache rules 110 at block 512. In this case, processing proceeds to block 510 where cache management module 108 adjust rules of the existing entry, in this case, to merge two adjacent regions results in the entries at block 514. That is, Region 1 now specifies that for LBAs of 100 through 299, the cache rule is to specify that the cache management module 108 is to always wait for space in cache memory 112 before writing the data to the cache memory. In one example, cache management module 108 processing may proceed back to block 502 to continue to check for input region specification requests.

Figure 5D:
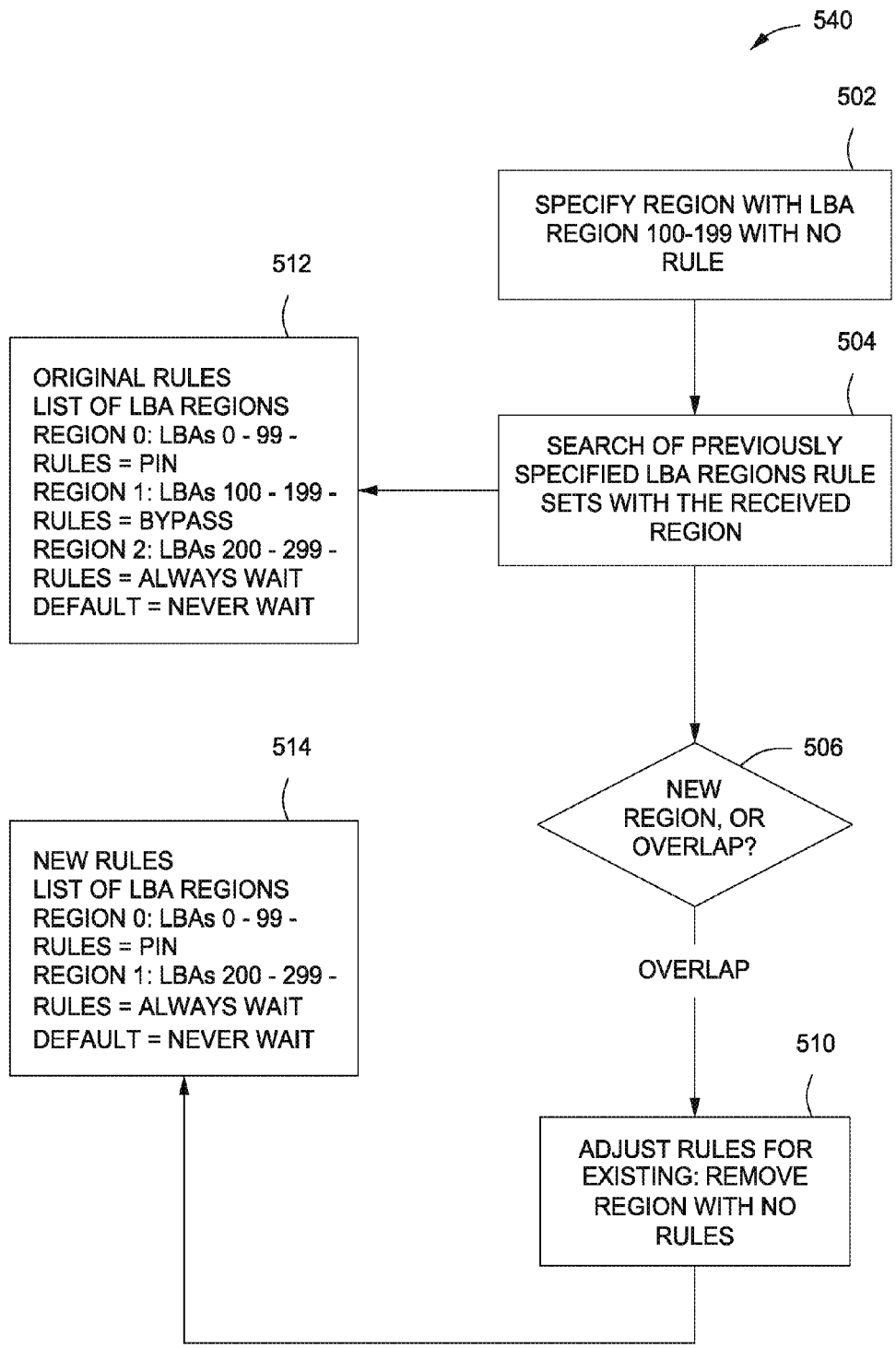

FIG. 5D illustrates an example process flow diagram 540 of cache management techniques in accordance with the techniques of the present application. The process illustrated in FIG. 5D is similar to FIG. 5A except in the description of FIG. 5D the storage controller 104 receives a specific region request and thereby the process follows a particular path. It will be further assumed that block 512 provides a list of original cache rules 110 and block 514 provides a list of new or adjusted cache rules, as described below.

Processing may begin at block 502 where storage controller 104 receives rules for regions via region specification request operations. In this example, to illustrate, it may be assumed that the request specifies a region with LBA region 100-199 with no cache rules. That is, in this case, the cache rule specifies to apply the default rules for how to handle cache memory 112 when later receiving data operations requests with LBA region of 100-199. The cache management module 108 processing proceeds to block 504 where storage controller 104 searches previously specified cache rules 110 with the received region request. In one example, cache management module 108 searches cache rules 110 at block 512 to determine whether the received region is listed in the cache rules. In this case, cache management module 108 determines that the received region request (LBA region 100-199 with no cache rules) appears to be present in cache rules 110 at block 512. The cache management module 108 processing proceeds to block 506 for further analysis.

At block 506, storage controller 104 checks the received regions to determine whether they are new regions or whether there are overlaps. In this case, cache management module 108 determines that there is an overlap between the received region and a region listed in cache rules 110 at block 512. In this case, processing proceeds to block 510 where storage controller 104 adjusts rules for existing entry, in this case, to remove regions with no rules. In one example, cache management module 108 removes the entries in cache rules 110 and associated with LBA regions 100-199 resulting in the entries at block 514. That is, Region 1 (LBAs 100 through 199 with rules to bypass) at block 512 is no longer present as shown in block 514. In one example, cache management module 108 processing may proceed back to block 502 to continue to check for input region specification requests.

Figure 5E:
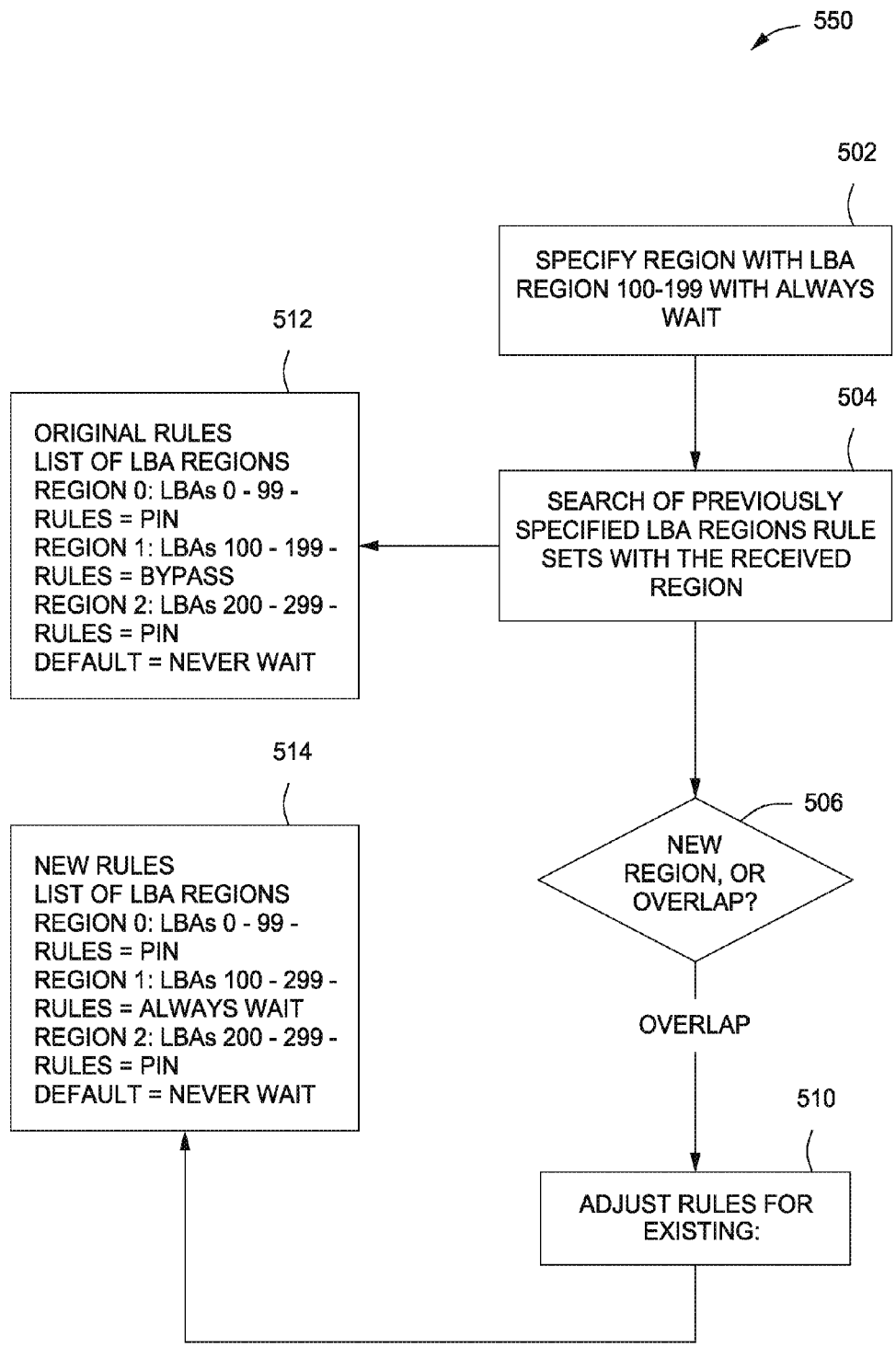

FIG. 5E illustrates an example process flow diagram 550 of cache management techniques in accordance with the techniques of the present application. The process illustrated in FIG. 5E is similar to FIG. 5A except in the description of FIG. 5E the storage controller 104 receives a specific region request and thereby the process follows a particular path. It will be further assumed that block 512 provides a list of original or current cache rules 110 and block 514 provides a list of new or revised cache rules after processing of the request, as described below.

Processing may begin at block 502 where storage controller 104 receives rules for regions via region specification request operations. In this example, to illustrate, it may be assumed that the request specifies region with LBA region 100-199 with a cache rule that specifies to always wait for space in cache memory 112. That is, in this case, the cache rule specifies or instructs cache management module 108 to wait for space in cache memory before it stores the data in the cache memory. The cache management module 108 processing proceeds to block 504 where storage controller 104 searches previously specified regions rule sets with the received region request. In one example, cache management module 108 searches the cache list at block 512 to determine whether the received region is listed in the cache list. In this case, cache management module 108 determines that the received region request (LBA region 100-199 with cache rule to specify to always wait for space in cache memory) appears to be present in the list at block 512. The cache management module 108 processing proceeds to block 506 for further analysis.

At block 506, storage controller 104 checks the received regions to determine whether they are new regions or whether there are overlaps. In this case, cache management module 108 determines that there is an overlap between the received region and a region listed in the cache list at block 512. In this case, processing proceeds to block 510 where cache management module 108 adjusts rules for the existing entry, in this case, merge two adjacent regions. In one example, cache management module 108 adjusts the entries in the region list at block 512 resulting in the entries at block 514. That is, now Region 1 is to specify cache rules to always wait as shown at block 514. In one example, cache management module 108 processing may proceed back to block 502 to continue to check for input region specification requests.

Figure 5F:
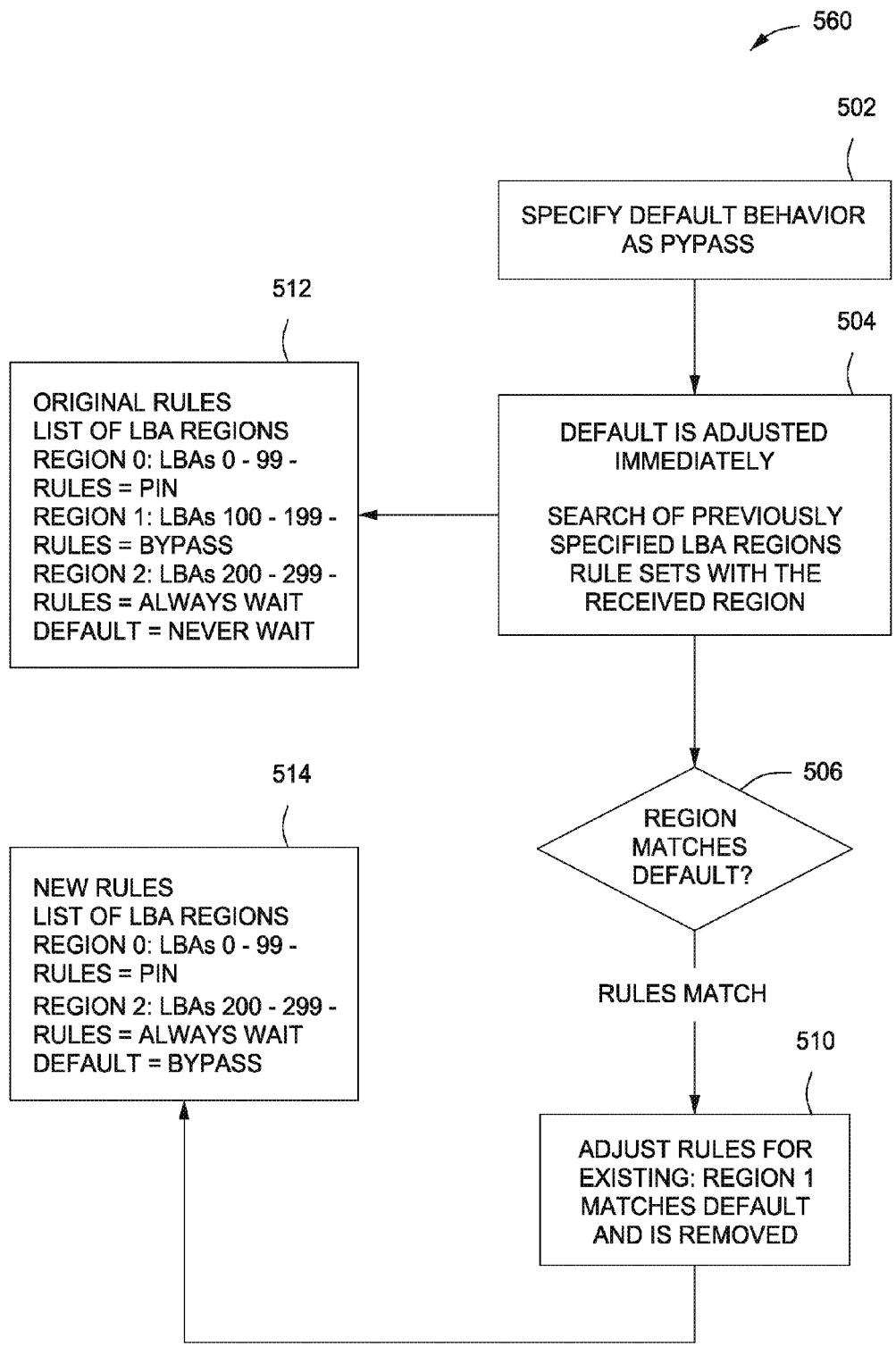

FIG. 5F illustrates an example process flow diagram 560 of cache management techniques in accordance with the techniques of the present application. The process illustrated in FIG. 5F is similar to FIG. 5A except in the description of FIG. 5F the storage controller 104 receives a specific region request and thereby the process follows a particular path. It will be further assumed that block 512 provides a list of original rules and block 514 provides a list of new rules, as described below.

Processing may begin at block 502 where storage controller 104 receives rules for regions via region specification request operations. In this example, to illustrate, it may be assumed that the request specifies default behavior bypass. That is, in this case, the cache rule specifies or instructs cache management module 108 that if the region specified in the region specification request does appear in the cache list then the default behavior is to bypass cache memory and store the data to data storage 114 and not cache memory 112. The cache management module 108 processing proceeds to block 504 where storage controller 104 searches previously specified regions rule sets with the received region request. In one example, cache management module 108 searches the cache list at block 512 to determine whether the received region is listed in the cache rules. In this case, cache management module 108 determines that the received region request (specifies default behavior bypass) appears to be present in the list at block 512. The cache management module 108 processing proceeds to block 506 for further analysis.

At block 506, storage controller 104 checks the received regions to determine whether they are new regions or whether there are overlaps. In this case, the storage controller 104 determines that there is a match between the received region and a region listed in the region list. In this case, processing proceeds to block 510 where storage controller 104 adjust rules for existing entry, in this case, cache management module 108 removes the entry corresponding to Region 1 (LBAs 100-199 with cache rules to bypass) since the cache rules specifies to bypass which matches the cache rules of the received region specification request. In this case, cache management module 108 adjusts the entries in cache rule at block 512 resulting in the entries at block 514. In one example, cache management module 108 processing may proceed back to block 502 to continue to check for input region specification requests.

It should be understood that the processes described with respect to FIGS. 5A through 5F are for illustrative purposes and other examples may be employed to implement the techniques of the present application. For example, the entries of cache rules list 512 are for illustrative purposes and that a different number and type of cache rules and associated LBA regions may be employed to practice the techniques of the present application.

FIGS. 6A-6E are example process flow diagrams of cache management techniques in accordance with the techniques of the present application. The process flow diagrams of FIGS. 6A-6E describe how storage controller 104 manages cache memory 112 when processing data operation requests. As explained above, storage controller 104 may receive from hosts 102 region specification requests which may specify how cache management module 108 is control the behavior of cache memory 112 with respect to data operation requests that specify regions of storage associated with LBA of data storage 114. The storage controller 104 may then receive from hosts 102 a data operation request which may specify a write operation to write data to data storage and the request may include the data to be written and an LBA region of the location in data storage 114 to write the data. In another example, the data operation request may specify a read operation to read data from data storage and the request may include an LBA region of the location of the data storage to read the data. As explained below in further detail, storage controller 104 may process the data operation requests based on information from the LBA region of the data operation request compared to cache rules 110 that contain previously received information from LBA regions from the region specification requests.

Figures 1, 6A:
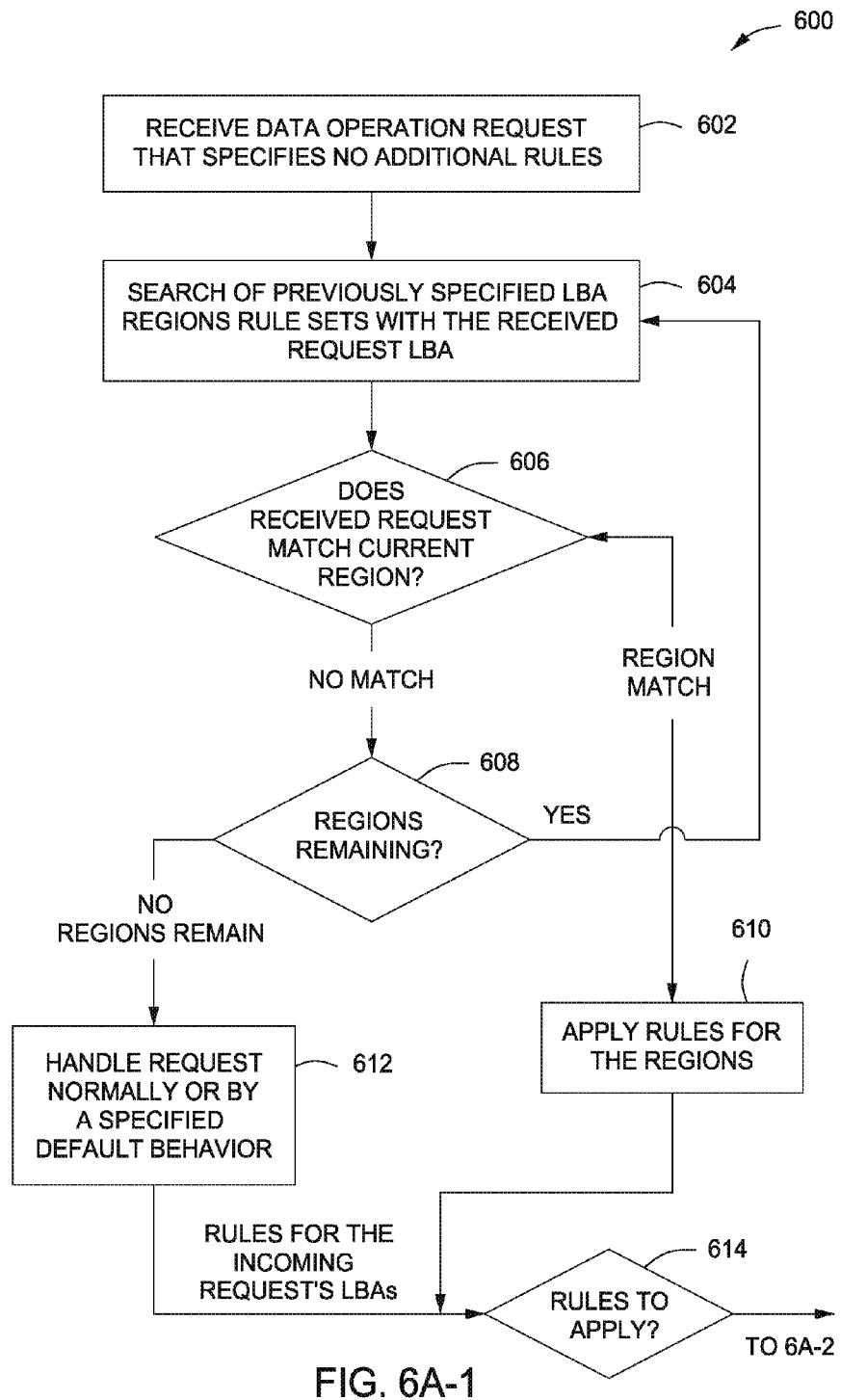
FIGS. 6A-6E are example process flow diagrams of cache management in accordance with the techniques of the present application.
Figures 2, 6A:
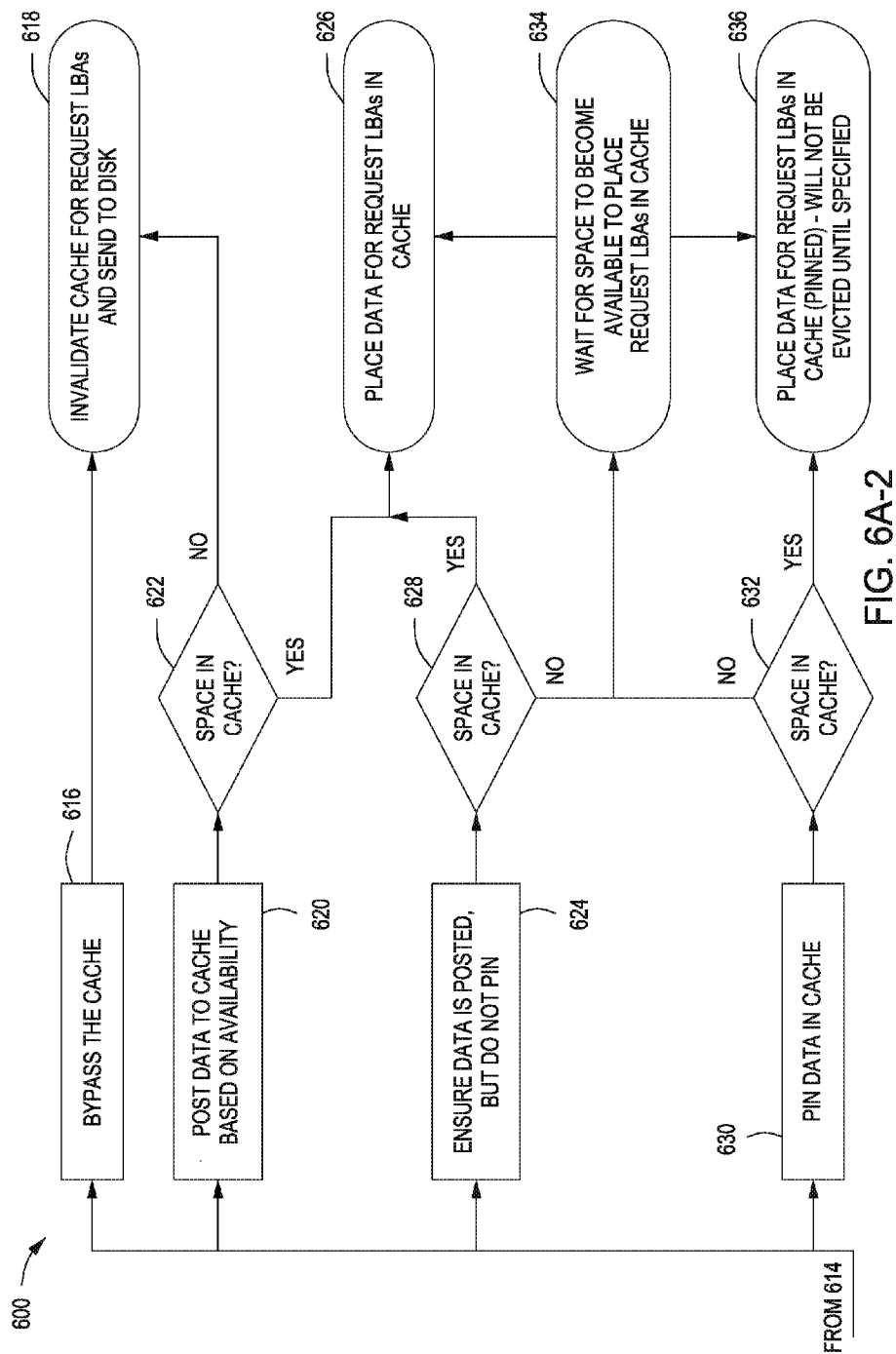

FIG. 6A (FIG. 6A-1 and FIG. 6A-2) illustrates an example process flow diagram 600 of cache management techniques in accordance with the techniques of the present application.

Processing may begin at block 602 where storage controller 104 receives a data operation request that specifies no additional rules. In one example, cache management module 108 may receive from hosts 102 a data operation request which may specify a write operation to write data to data storage and the request may include the data to be written and an LBA region of the location in data storage 114 to write the data. In another example, cache management module 108 may receive a data operation request that may specify a read operation to read data from data storage 114 and the request may include an LBA region of the location in the data storage to read the data. The cache management module 108 processing then proceeds to block 604 where storage controller 104 searches cache rules 110 that contain previously specified LBA regions rule sets using the received LBA.

At block 608, in one example, cache management module 108 may search cache rules 110 that include entries of previously received LBA regions and associated cache rules. The cache management 108 processing then proceeds to block 606 where storage controller 104 checks whether the received request matches entries in cache rules 110. If cache management 108 determines that there is a match, then processing proceeds to block 610. On the other hand, if cache management 108 determines that there is no match, then processing proceeds to block 608.

At block 608, storage controller 104 checks where there are regions remaining. In one example, cache management 108 may search cache rules 110 using a linear search, binary search or any other appropriate search technique. If cache management 108 determines that regions remain to be checked in cache rules 110, then processing proceeds back to block 604 to continue to search previously specified region rules in the cache rules. On the other hand, if cache management 108 determines that no regions remain to be checked in cache rules 110, then processing proceeds to block 612.

Figure 6B:
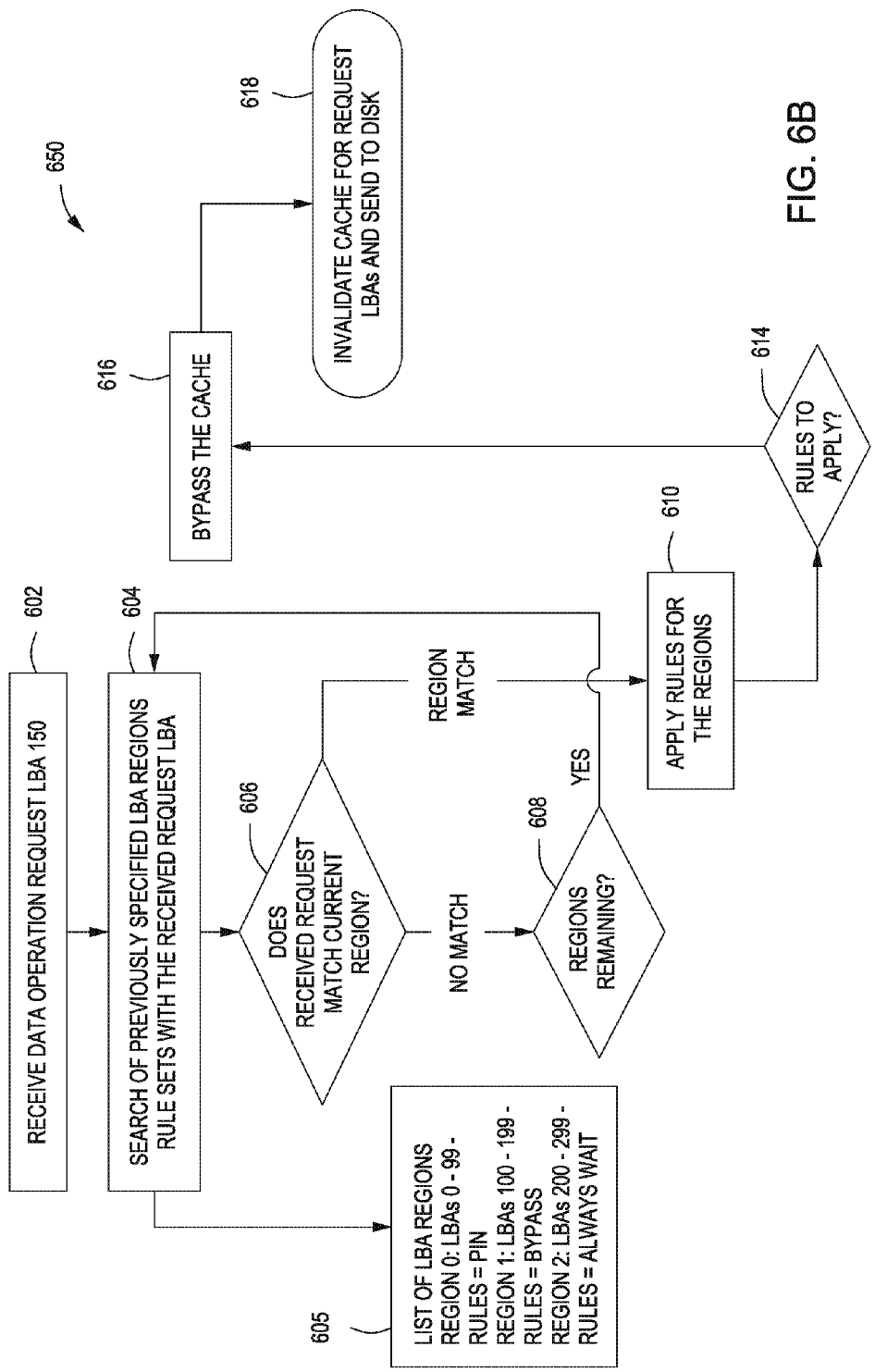
Figure 6C:
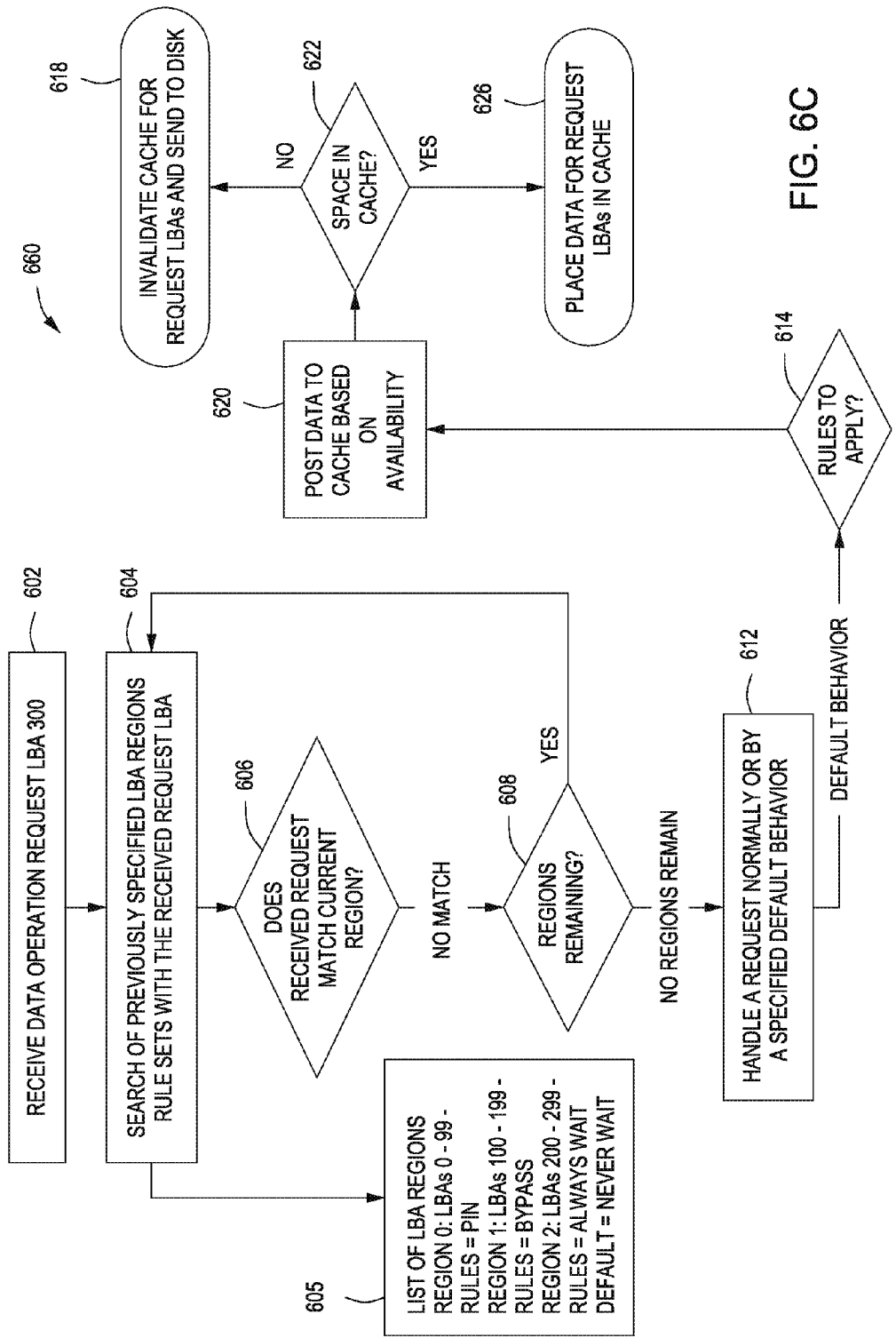

At block 612, storage controller 104 handles the request normally or by a specified default behavior. In one example, this block may describe the result of a lookup operation such as in FIG. 6B where the lookup operation includes inspecting cache rules at block 605. If a cache rule was found at block 606, then processing is to proceed to block 610, however if the process does not find a cache rule that matches the incoming request, processing proceeds to execute a Default behavior. In one example, storage controller 104 may have designated Default behavior as shown in FIG. 6C (Never Wait for Room), or it may be left up to the storage controller to select a Default behavior if one is not specified. This behavior may then be applied to the request according to the cache rule selected. The cache management module 108 processing then proceeds to block 614.

At block 610, storage controller 104 applies rules for the regions. In one example, to illustrate operation, cache management module 108 may apply cache rules 110 that specify processing data in a persistent (pinning) manner in cache memory 112. In one example, in a data caching solution, the solution may include a separate storage area which may provide faster access than the storage media being used to handle the request. In this case, cache management module 108 may use memory dedicated to servicing the request. The cache management module 108 processing then proceeds to block 614.

At block 614, storage controller 104 determines which cache rules to apply as described below in respective blocks 616, 620, 624 and 630, with examples described herein.

At block 616, storage controller 104 executes the cache rules to cause the cache management module 108 to bypass cache memory 112. In one example, cache management module 108 may bypass cache memory 112 and instead write the data directly to the corresponding LBA in data storage 114. In one example, data storage 114 may be data storage medium which may be slower to access but may have considerably larger capacity than cache memory 112. In this case, this may represent end placement of all data written by hosts 102. The cache management module 108 processing then proceeds to block 618.

At block 618, storage controller 104 invalidates the cache for request LBAs and sends to data storage which may be disk drive storage. In one example, data storage 114 may be data storage medium. In this case, requests that cannot be serviced by cache memory 112 may be serviced by data storage 114. The cache rule specified by the example describes a bypass operation, which means the rule is stating that cache memory 112 will not be used to service the request, but rather it will be serviced by data storage array 106. In one example, cache management module 108 sends a request to data storage array 106 to write the data to data storage 114 associated with the LBA region. In one example, cache management module 108 processing may then proceed back to block 602 to process further input data operation requests.

At block 620, storage controller 104 posts or writes the data to cache memory 112 based on availability. In one example, cache rules 110 may specify that cache management module 108 should not have to wait for space or room in cache memory 112 to write the data to cache memory 112. In one example, typically cache memory 112 can service requests faster than data storage array, thus it may be possible for there to be no available space inside of the cache memory for servicing the request. In this scenario, cache management module 108 will be looking for data to evict from the cache memory. In the case of a For a Never Wait for Room cache rule, if there is no space available, cache management module 108 will send the request directly to data storage array 106. The cache management module 108 processing then proceeds to block 622 for subsequent processing.

At block 622, storage controller 104 checks cache memory 112 to determine whether there is space or room in the cache memory. In one example, in the Always Wait for Room cache rule case and Pin Data in Cache rule, the incoming requests may be associated with rules that instruct the cache management module 108 to place the data in cache memory 112. In this scenario, the data eviction described above will be required to be completed to service these requests. As mentioned above, data storage array 106 may be lower access speed than cache memory 112 and the wait time may be contingent on the time it takes for the data storage array to service the request created when the data was evicted from the cache memory. In one example, if cache management module 108 determines that there is space available, then processing proceeds to block 626 as described below. On the other hand, if cache management module 108 determines that there is no space available, then processing proceeds to block 618 as described above.

At block 624, storage controller 104 ensures that data is posted or written to cache memory 112 but ensures that the data is not pinned to cache memory. In one example, cache management module 108 may process the this cache rule by always waiting for cache memory 112 to have storage space or room to hold the data. In one example, in the Always Wait for Room cache rule case and Pin Data cache rule, the incoming requests may be associated with rules that instruct the cache management module 108 to place the data in cache memory 112. In this scenario, the data eviction described above will be required to be completed to service these requests. As mentioned above, data storage array 106 may be lower access speed than cache memory 112, the wait time may be contingent on the time it takes for the data storage array to service the request created when the data was evicted from the cache memory. The cache management module 108 processing then proceeds to block 628.

At block 626, storage controller places data for request LBAs in the cache. In one example, cache management module 108 may perform this function using a First-In-First-Out (FIFO) technique or any other relevant techniques. In one example, the FIFO technique may include a method for evicting data from cache memory 112. Other techniques can be employed such as random technique (select a random data units in the cache memory and evict such data from the cache memory), or sorted technique (select the data in the LBA order and evict the selected data from the cache). Each of these techniques may have different advantages and disadvantages depending on the type of medium in the data storage array 106. In one example, cache management module 108 processing may then proceed back to block 602 to process further input data operation requests.

At block 628, storage controller 104 checks cache memory 112 to determine whether there is space or room in cache memory. As explained above, in one example, in the Always Wait for Room cache rule case and Pin Data in Cache rule, the incoming requests may be associated with rules that instruct the cache management module 108 to place the data in cache memory 112. In this scenario, the data eviction described above will be required to be completed to service these requests. As mentioned above, data storage array 106 may be lower access speed than cache memory 112, the wait time may be contingent on the time it takes for the data storage array to service the request created when the data was evicted from the cache memory. In one example, if cache management module 108 determines that there is space in cache memory 112 to write the data, then processing proceeds to block 626 as described above. On the other hand, if cache management module 108 determines that there is no space available, then processing proceeds to block 634 as described below.

At block 630, storage controller 104 pins the data to cache memory 112. In one example, cache management module 108 writes the data to cache memory 112 in a persistent manner. As explained above in one example, non-persistent may be defined as a condition or rule where data may be evicted from cache memory if space is needed. On the other hand, persistent (pinned) may be defined as a condition or rule where data may not be evicted from cache memory unless specified. The cache management module 108 processing then proceeds to block 632.

At block 632, storage controller 104 checks cache memory to determine whether there is space or room in cache memory. As explained above, in one example, in the Always Wait for Room cache rule case and Pin Data in Cache rule, the incoming requests may be associated with rules that instruct cache management module 108 to place the data in cache memory 112. In this scenario, the data eviction described above will be required to be completed to service these requests. As mentioned above, data storage array 106 may be lower access speed than cache memory 112, the wait time may be contingent on the time it takes for the data storage array to service the request created when the data was evicted from the cache memory. In one example, if cache management module 108 determines that there is space in cache memory 112, then processing proceeds to block 636. On the other hand, if cache management module 108 determines that there is no space available, then processing proceeds to block 634.

At block 634, storage controller 104 waits for space to become available to place request LBAs in cache memory 112. In one example, cache management module 108 processing may proceed to block 626 when the request specifies to always wait when space is available. As explained above, in one example, in the Always Wait for Room cache rule case and Pin Data in Cache rule, the incoming requests may be associated with rules that instruct the cache management module 108 to place the data in cache memory 112. In this scenario, the data eviction process described above may be required to be completed to service these requests. As mentioned above, data storage array 106 may be lower access speed than cache memory 112 and the wait time may be contingent on the time it takes for the data storage array to service the request created when the data was evicted from the cache memory. In another example, cache management module 108 processing proceeds to block 636 when the request specifies to manage the data in a persistent manner (pinned request) and when space is available in cache memory.

At block 636, storage controller 104 places data for request LBAs in cache memory in a persistent manner (Pinned). In one example, cache management module 108 may be configured to not evict the data from cache memory until a specified threshold is met. In one example, cache management module 108 may be configured to manage an amount of pinned regions such that it may not exceed the entire size of the cache memory 112. If this were the case, the storage controller 104 may be unable to satisfy the pinned rule specified. The "threshold" mentioned is the implementation of the above requirement. In one example, cache management module 108 processing may proceed back to block 602 to process further input data operation requests FIG. 6B illustrates an example process flow diagram 650 of cache management techniques in accordance with the techniques of the present application. The process illustrated in FIG. 6B is similar to FIG. 6A except in the description of FIG. 6B the storage controller 104 receives region information with a data operation request and thereby the process follows a particular path as described below in further detail.

To illustrate operation, it will be further assumed that block 606 represents provides cache rules 110 specifying how cache management module 108 is to handle cache memory 112 with respect to particular LBA regions. For example, it may be assumed that cache rules at block 605 includes a list of the following cache rules and associated LBA regions. For Region 0, the entry specifies that for data operation requests with LBA regions 0 through 99, cache rule 110 specifies that cache management module 108 is to store the data in a persistent manner (pinned) in cache memory 112. For Region 1, the entry specifies that for data operation requests with LBA regions 100 through 199, cache rule 110 specifies that cache management module 108 is to store the data to storage and bypass cache memory 112. For Region 2, the entry specifies that for data operation requests with LBA regions 200 through 299, cache rule 110 specifies that cache management module 108 is to wait to store the data to cache memory 112 based on availability of space of the cache memory. For Default, that is, for requests that are outside the ranges of the above LBA regions (Region 0, 1 and 2), the entry specifies cache management module 108 is not to wait for space in cache memory 112 to store the data in the cache memory. It should be understood the entries of cache rules 110 at block 605 are for illustrative purposes and that a different number and type of cache rules and associated LBA regions may be employed to practice the techniques of the present application. For example, cache rules 110 at block 605 may include a different number of entries specifying different LBA regions and different cache rules associated with the regions.

Processing may begin at block 602 where storage controller 104 receives a data operation request that provides a data operation that specifies a region of LBA 150. The cache management module 108 processing proceeds to block 604 storage controller 104 searches previously specified LBA regions and associated cache rules 110 at block 605 with the received request LBA. In one example, to illustrate operation, processing proceeds to block 604 where storage controller 104 determines that cache rules 110 to apply pertain to block 616. At block 616, storage controller 104 executes cache rules 110 to bypass cache memory 112. The cache management module 108 processing proceeds to block 618 where storage controller 104 invalidates cache memory 112 for request LBAs and sends to data storage which may be disk drive storage. In one example, cache management module 108 processing may proceed back to block 602 to process further input data operation requests.

FIG. 6C illustrates an example process flow diagram 660 of cache management techniques in accordance with the techniques of the present application. The process illustrated in FIG. 6C is similar to FIG. 6A except in the description of FIG. 6C the storage controller 104 receives region information with a data operation request and thereby the process follows a particular path as described below in further detail.

Processing may begin at block 602 where storage controller 104 receives a data operation request that provides a data operation that specifies a region of LBA 300. The cache management module 108 processing proceeds to block 604 where storage controller 104 searches previously specified LBA regions and cache rules 110 at block 605 with the received request LBA. In example, to illustrate operation, cache management module 108 processing proceeds to block 604 where storage controller 104 determines that cache rules 110 to apply pertain to block 620. At block 620, storage controller 104 posts or writes the data to cache memory 112 based on availability in a similar manner as described above.

Figure 6D:
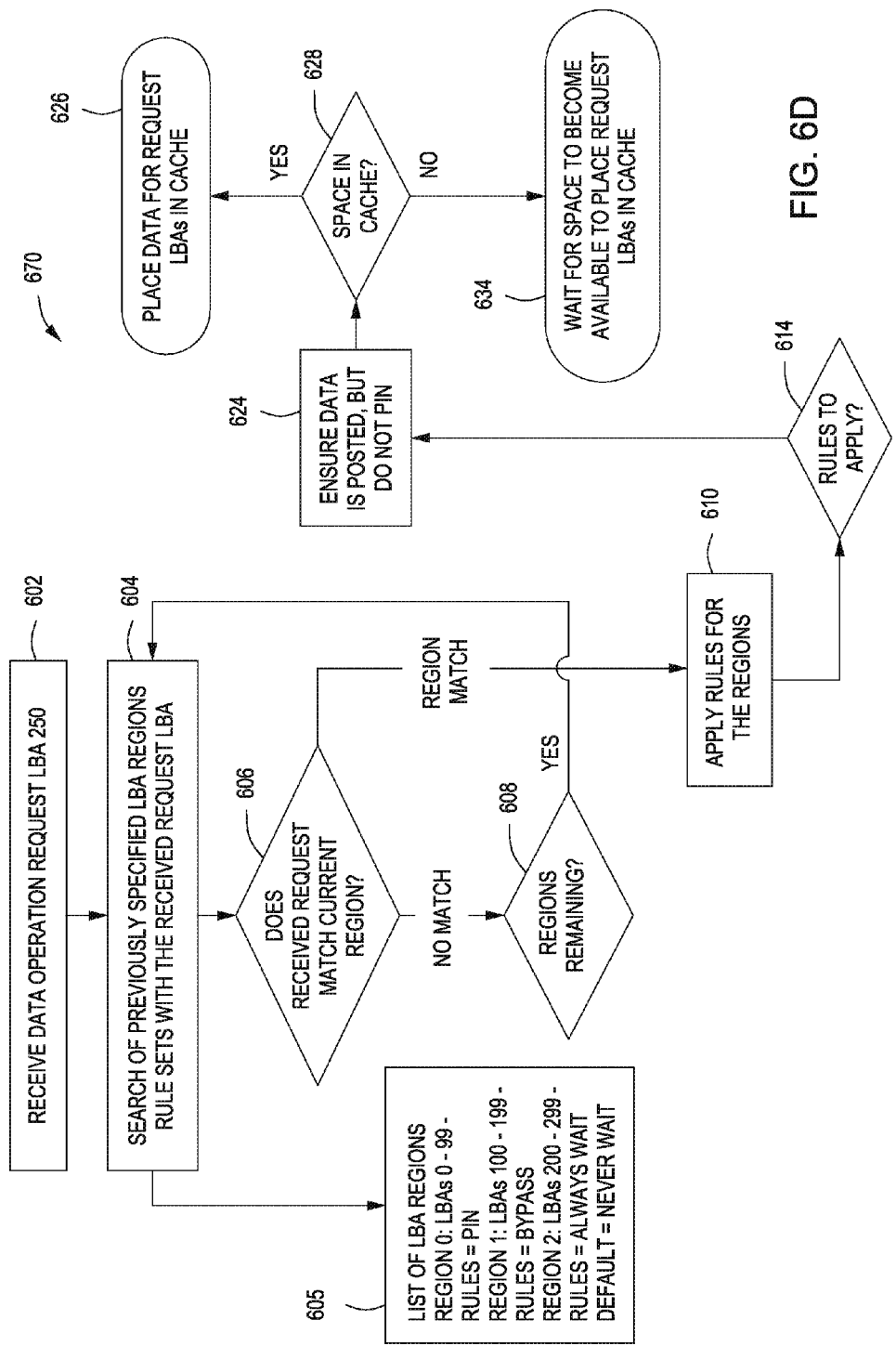

FIG. 6D illustrates an example process flow diagram 670 of cache management techniques in accordance with the techniques of the present application. The process illustrated in FIG. 6D is similar to FIG. 6A except in the description of FIG. 6D the storage controller 104 receives region information with a data operation request and thereby the process follows a particular path as described below in further detail.

Processing may begin at block 602 where storage controller 104 receives a data operation request that provides a data operation that specifies a region of LBA 250. The cache management module 108 processing proceeds to block 604 where it searches previously specified LBA regions and cache rules 110 at block 605 with the received request LBA. In one example, to illustrate operation, cache management module 108 processing proceeds to block 614 where it determines that cache rules 110 to apply pertain to block 624. At block 624, storage controller 104 ensures that data is posted or written to cache memory 112 and ensures that the data is not pinned to cache memory (e.g., always wait for room or space) in a similar manner as described above.

Figure 6E:
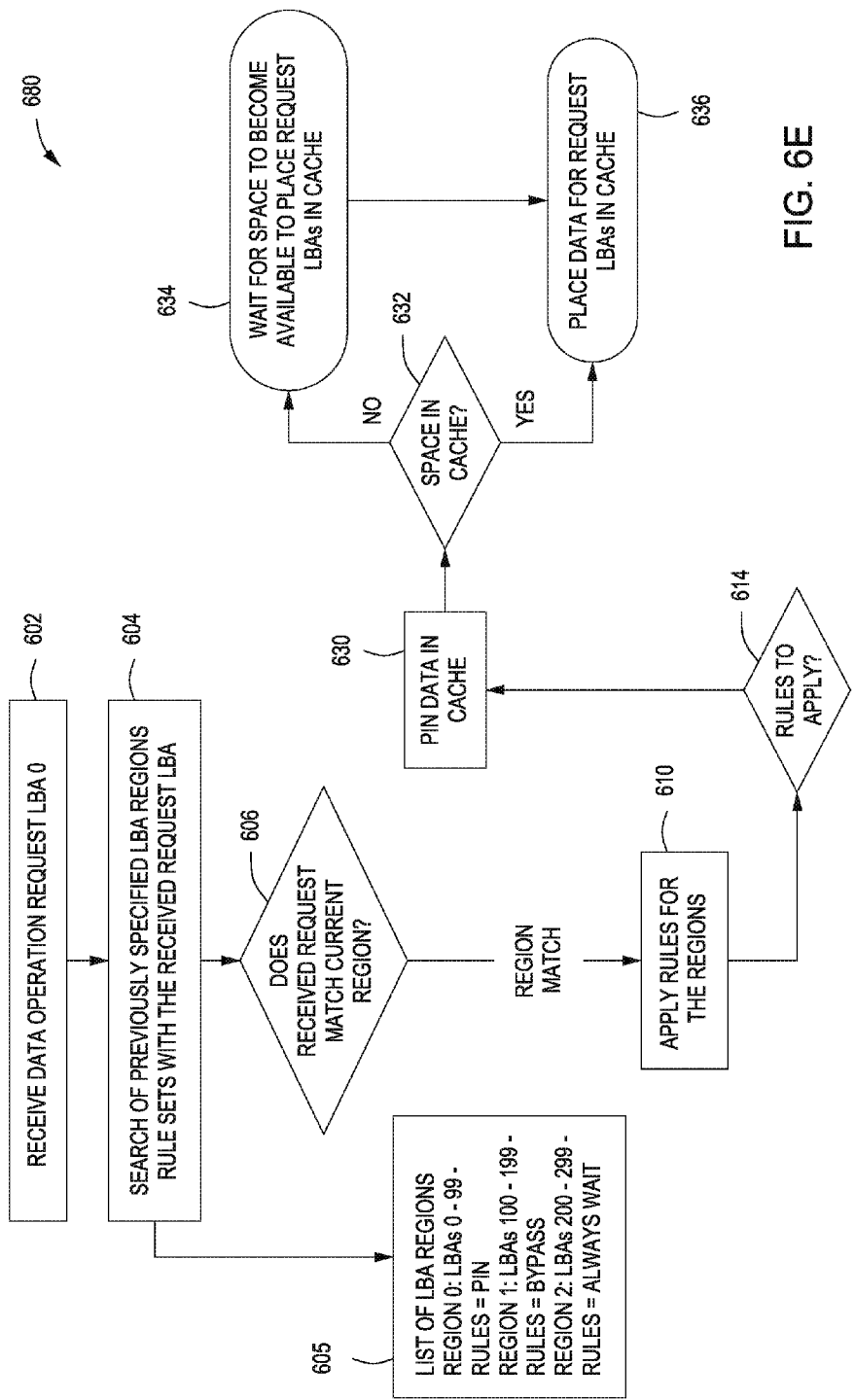

FIG. 6E illustrates an example process flow diagram 680 of cache management techniques in accordance with the techniques of the present application. The process illustrated in FIG. 6E is similar to FIG. 6A except in the description of FIG. 6E the storage controller 104 receives region information with a data operation request and thereby the process follows a particular path as described below in further detail.

Processing may begin at block 602 where storage controller 104 receives a data operation request that provides a data operation that specifies a region of LBA "0". The cache management module 108 processing proceeds to block 604 where storage controller 104 searches previously specified LBA regions and cache rules 110 at block 605 with the received request LBA. In one example, to illustrate operation, processing proceeds to block 614 where storage controller 104 determines that cache rules 110 to apply pertain to block 630. At block 630, storage controller 104 pins the data to cache memory 112 in a similar manner as described above.

It should be understood that the processes described with respect to FIGS. 6A through 6E are for illustrative purposes and other examples may be employed to implement the techniques of the present application. For example, the entries of cache rules 110 at block 605 are for illustrative purposes and that a different number and type of cache rules and associated LBA regions may be employed to practice the techniques of the present application.

Figure 7:
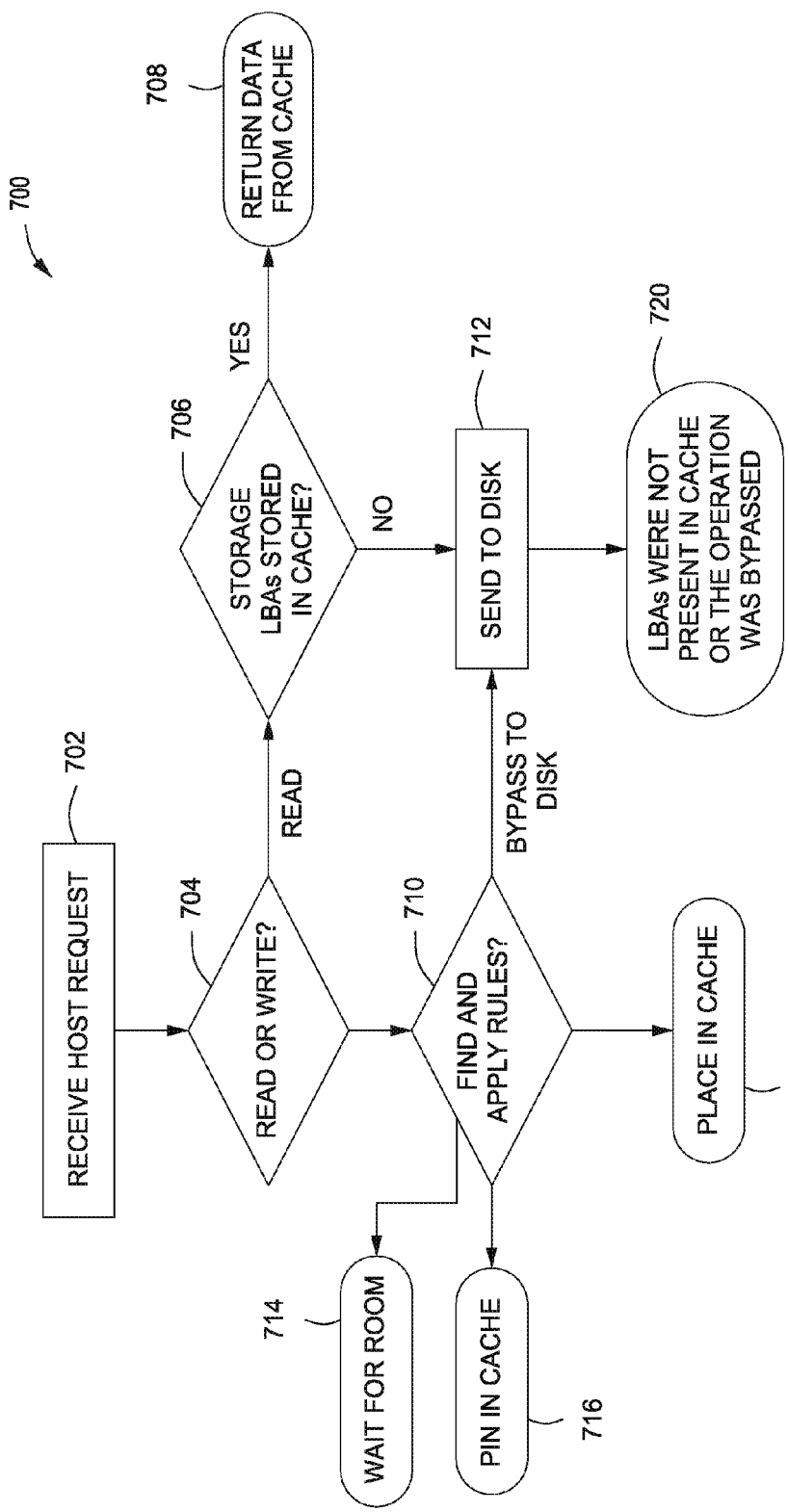
FIG. 7 is another example process flow diagram of a cache management in accordance with the techniques of the present application.

FIG. 7 is another example process flow diagram 700 of a cache management technique in accordance with the techniques of the present application.

Processing may begin at block 702 where storage controller 104 receives requests from host 102. In some examples, cache management module 108 may receive requests which may be data operation requests to read data from data storage and data operations requests to write data to data storage. The cache management module 108 processing proceeds to block 704.

At block 704, storage controller 104 checks whether the request is a data operation request to read data from data storage or a data operation request to write data to data storage. For example, if cache management module 108 determines that the request is a data operation request to read data from data storage, then processing proceeds to block 706 for subsequent processing of the read data operation. On the other hand, if cache management module 108 determines that the request is a data operation request write data to data storage, then processing proceeds to block 710 for subsequent processing of the write data operation.

At block 706, storage controller 104 checks whether the data associated with LBA region information from the read data operation is stored in cache memory. In one example if cache management module 108 determines that the data is stored in cache memory 112, then processing proceeds to block 708. On the other hand, if cache management module 108 determines that the data is not stored in cache memory 112, then processing proceeds to block 712.

At block 708, storage controller 104 returns the data from cache memory. In one example, cache management module 108 retrieves the data associated with LBA region information of the read data operation from cache memory 112. In some examples, cache management module 108 processing may proceed back to block 702 to check for receipt of further data operation requests from hosts 102.

At block 710, storage controller 104 processes the data operation request by finding and applying appropriate cache rules. For example, if cache management module 108 finds the appropriate cache rules 110, then processing proceeds to the respective processing blocks 712, 714, 716 or 718 as explained below.

At block 712, storage controller 104 sends the request to data storage. In one example, cache management module 108 processes the data operation request by sending the requested data to the data storage 114 based on the LBA region specified in the operation. The cache management module 108 processing proceeds to block 720.

At block 714, storage controller 104 waits for room in cache memory. In one example, cache management module 108 waits for room or storage space in cache memory 112 before proceeding to write the data to the cache memory. In some examples, cache management module 108 processing may proceed back to block 702 to check for receipt of further data operation requests from hosts 102.

At block 716, storage controller 104 pins the data to cache memory. In one example, cache management module 108 proceeds to write the data to cache memory 112 in a persistent manner. In some examples, cache management module 108 processing may proceed back to block 702 to check for receipt of further data operation requests from hosts 102.

At block 718, storage controller 104 places the data to cache memory. In one example, cache management module 108 proceeds to writes the data to cache memory 112. In some examples, cache management module 108 processing may proceed back to block 702 to check for receipt of further data operation requests from hosts 102.

At block 720, storage controller 104 acknowledges that LBAs were not present in cache or the operation was bypassed. In one example, cache management module 108 proceeds to notify the relevant host that the data with the associated LBAs were not present in cache memory 112 or that the operation was bypassed. In some examples, cache management module 108 processing may proceed back to block 702 to check for receipt of further data operation requests from hosts 102.

It should be understood that the processes described with respect to FIG. 7 is for illustrative purposes and other examples may be employed to implement the techniques of the present application.

Figure 8:
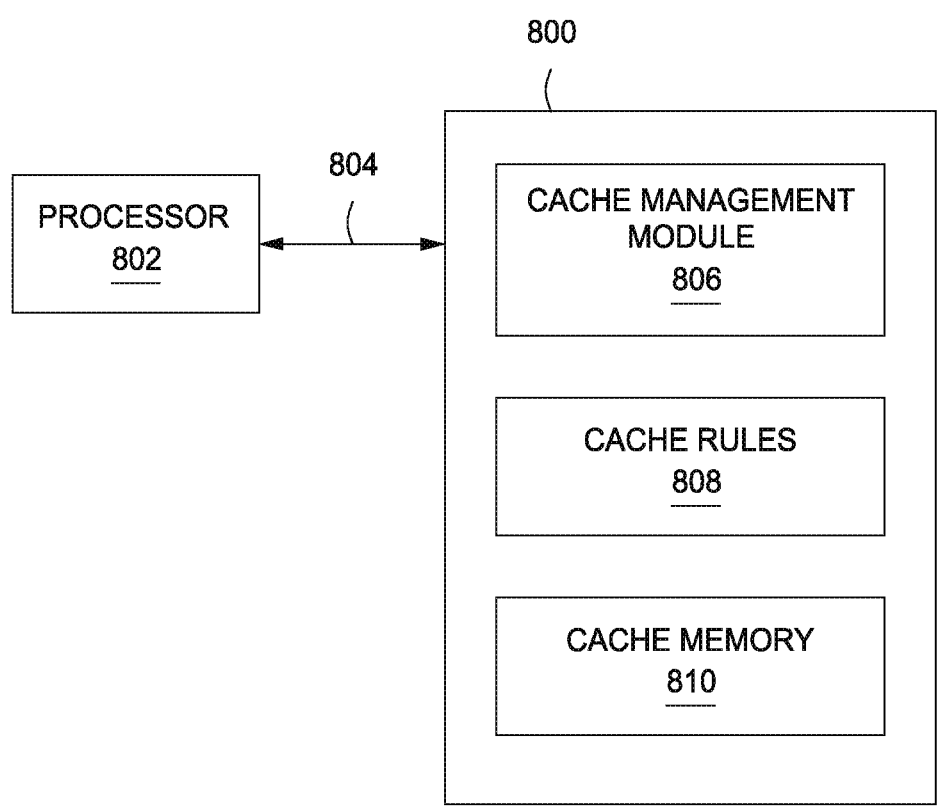
FIG. 8 is an example block diagram showing a non-transitory, computer-readable medium that stores instructions for cache management in accordance with the techniques of the present application.

FIG. 8 is an example block diagram showing a non-transitory, computer-readable medium that stores instructions for cache management in accordance with the techniques of the present application. The non-transitory, computer-readable medium is generally referred to by the reference number 800 and may be included in devices of system 100 as described herein. The non-transitory, computer-readable medium 800 may correspond to any typical storage device that stores computer-implemented instructions, such as programming code or the like. For example, the non-transitory, computer-readable medium 800 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

A processor 802 generally retrieves and executes the instructions stored in the non-transitory, computer-readable medium 800 to operate the devices of system 100 in accordance with an example. In an example, the tangible, machine-readable medium 800 may be accessed by the processor 802 over a bus 804. A first region 806 of the non-transitory, computer-readable medium 300 may include cache management module functionality as described herein. A second region 808 of the non-transitory, computer-readable medium 800 may include cache rules data as described herein. A third region 810 of the non-transitory, computer-readable medium 800 may include cache memory as described herein Although shown as contiguous blocks, the software components may be stored in any order or configuration. For example, if the non-transitory, computer-readable medium 800 is a hard drive, the software components may be stored in non-contiguous, or even overlapping, sectors.

What is claimed is:

1. A storage controller for cache management, the storage controller comprising:
a cache memory; and
a cache management module to:
in response to receipt of a region specification request from a host that contains cache rules and no read or write operation commands, extract from the region specification request the cache rules for management of the cache memory and regions of data storage of a storage array,
subsequent to the receipt of the region specification request, receive a data operation request from the host to read data from or write data to the data storage of the storage array, wherein the data operation request contains a read or write operation command with no additional cache rules, and
in response to receipt of the data operation request from the host, process the data operation request based on the cache rules received from the host,
wherein the cache rules received from the host comprise a cache rule to control whether the storage controller is to wait to store the data, from the host for a given region of the regions of data storage, to the cache memory based on a state of the cache memory.

2. The storage controller of claim 1, wherein the cache management module is to receive the region specification request that specifies behavior of the cache memory with respect to specific regions of storage associated with logical block address (LBA) of storage.

3. The storage controller of claim 1, wherein the cache management module is to receive the data operation request from the host that includes at least one of a write request that includes data to write to storage and identification of specific regions of the data storage to write the data and a read request that includes identification of the specific regions of the data storage to read the data, and wherein the cache management module is to compare the specific regions identified from the data operation request with a list of regions received from the region specification request.

4. The storage controller of claim 1, wherein the cache rules received from the host further comprise a cache rule to flush a given region of the regions of data storage upon occurrence of a condition.

5. The storage controller of claim 1, wherein the cache rule to control whether the storage controller waits to accept data from the host comprises a rule to cause the storage controller to not wait to accept the data in response to space for the data for the given region not being available in the cache memory.

6. The storage controller of claim 1, wherein the cache rule to control whether the storage controller waits to accept data from the host comprises a rule to cause the storage controller to wait to accept the data in response to space for the data for the given region not being available in the cache memory.

7. The storage controller of claim 1, wherein the extracted cache rules further comprise a rule to identify first data having a higher priority than second data.

8. The storage controller of claim 1, wherein the storage controller comprises:
a processor; and
a memory to store instructions that, when executed by the processor, cause the processor to provide the cache management module.

9. The storage controller of claim 1, wherein:
the region specification request is associated with the given region of the regions of the data storage of the storage array;
the cache management module is to extract a given cache rule of the cache rules from the region specification request;
the data operation request is associated with the given region; and
the cache management module is to process the data operation request based on the extracted given cache rule.

10. The storage controller of claim 9, wherein the region specification request is separate from the data operation request.

11. The storage controller of claim 1, wherein the cache rules received from the host further comprise at least one of a cache rule to store the data to the data storage of the storage array and bypass the cache memory, a cache rule to store the data to the cache memory based on an availability of space of the cache memory, and a cache rule to store the data to the cache memory in a non-persistent manner in the cache memory.

12. A method of cache management, the method comprising:
in response to receiving a region specification request from a host that contains cache rules and no read or write operation commands, extracting from the region specification request, by a processor, cache rules for management of a cache memory and regions of data storage of a storage array;
subsequent to receiving the region specification request, receiving a data operation request from the host to read data from or write data to the data storage of the storage array, wherein the data operation request contains a read or write operation command with no additional cache rules; and
in response to receiving the data operation request from the host, processing, by the processor, the data operation request based on the cache rules received from the host,
wherein the cache rules received from the host comprise a cache rule to control whether the storage controller is to wait to store the data, from the host for a given region of the regions of data storage, to the cache memory based on a state of the cache memory.

13. The method of claim 12, wherein the data operation request includes at least one of host requests to read data from storage and write data to storage.

14. The method of claim 12, wherein the region specification request specifies behavior of the cache memory with respect to specific regions of storage associated with logical block address (LBA) of storage.

15. The method of claim 12, wherein the data operation request received from the host includes at least one of a write request that includes data to write to storage and identification of specific regions of the data storage to write the data and a read request that includes identification of the specific regions of the data storage to read the data, and wherein the method further comprises: comparing the specific regions from the data operation request with a list of regions received from the region specification request.

16. The method of claim 12, wherein the cache rules received from the host further comprise at least one of a cache rule to store the data to the data storage of the storage array and bypass the cache memory, a cache rule to store the data to the cache memory based on an availability of space of the cache memory, and a cache rule to store the data to the cache memory in a non-persistent manner in the cache memory.

17. A non-transitory computer-readable medium having computer executable instructions stored thereon for cache management, the instructions are executable by a processor to:
in response to receipt a region specification request from a host that contains cache rules and no read or write operation commands, extract from the region specification request the cache rules for management of a cache memory and regions of data storage of a storage array;
subsequent to the receipt of the region specification request, receive a data operation request from the host to read data from or write data to the data storage of the storage array, wherein the data operation request contains a read or write operation command with no additional cache rules; and
in response to the receipt of the data operation request from the host, process the data operation request based on the cache rules received from the host,
wherein the cache rules received from the host comprise a cache rule to control whether the storage controller is to wait to store the data, from the host for a given region of the regions of data storage, to the cache memory based on a state of the cache memory.

18. The non-transitory computer-readable medium of claim 17, further comprising instructions that if executed cause the processor to receive the region specification request that specifies behavior of the cache memory with respect to specific regions of storage associated with logical block address (LBA) of storage.

19. The non-transitory computer-readable medium of claim 17, further comprising instructions that if executed cause the processor to receive data operation request from the host that includes at least one of a write request that includes data to write to storage and identification of specific regions of the data storage to write the data and a read request that includes identification of the specific regions of the data storage to read the data, and compare the specific regions from the data operation request with a list of regions received from the region specification request.

20. The non-transitory computer-readable medium of claim 17, wherein the cache rules received from the host further comprise at least one of a cache rule to store the data to the data storage of the storage array and bypass the cache memory, a cache rule to store the data to the cache memory based on an availability of space of the cache memory, and a cache rule to store the data to the cache memory in a non-persistent manner in the cache memory.

* * * * *